United States Patent [19]
Kumagai et al.

[11] Patent Number: 6,151,028
[45] Date of Patent: Nov. 21, 2000

[54] IMAGE PROCESSING APPARATUS, METHOD AND SYSTEM

[75] Inventors: Atsushi Kumagai, Yokohama; Akihiro Katayama, Yokosuka; Shinji Uchiyama, Yokohama, all of Japan

[73] Assignee: Canon Kabushiki Kaisha, Tokyo, Japan

[21] Appl. No.: 09/038,685

[22] Filed: Mar. 9, 1998

[30] Foreign Application Priority Data

Mar. 10, 1997 [JP] Japan ................................. 9-054782

[51] Int. Cl.⁷ ................................................. G06T 15/10
[52] U.S. Cl. ........................ 345/427; 345/420; 345/425; 345/426; 345/429; 345/433
[58] Field of Search ................... 345/419, 420, 345/425, 426, 427, 429, 433, 441

[56] References Cited

U.S. PATENT DOCUMENTS

| | | | |
|---|---|---|---|
| 5,361,349 | 11/1994 | Sugita et al. ............................. | 345/346 |
| 5,886,704 | 3/1999 | Kang et al. .............................. | 345/426 |
| 5,894,309 | 4/1999 | Freeman et al. ......................... | 345/426 |

FOREIGN PATENT DOCUMENTS 0865001  9/1998  European Pat. Off. ........ G06T 15/00

OTHER PUBLICATIONS

"Collaborative Cyber Mirage: A Shared Cyberspace With Mixed Reality", S. Uchiyama et al., Proc. Int. Conf. on Virtual Systems and Multimedia VSMM '97 (CAT. No. 97TB100182), Geneva, Switzerland, Sep. 10–12, 1997, pp. 9–18, XP002104966.

"Distributed Microscopy: towards a 3D Computer graphic–based Multi–User Microscope Manipulation, Imaging and Measurement System", A. Sulzmann et al., Sensor Fusion and Distributed Robotic Agents, boston, MA, USA, Nov. 21–22, 1996, vol. 2905, pp. 183–192, XP00210597.

"Virtual Reality In Medicine–Computer Graphics and Inter-action Techniques", M. Hauloner et al., IEEE Transactions on Information Technology In BioMedicine, vol. 1, No. 1, Mar. 1997, pp. 61–72, XP000720885.

"Dive–A Platform for Multi–User Virtual Environments", C. Carlson, et al., Computers and Graphics, vol. 17, No. 6, Nov. 1, 1993, pp. 663–669 XP000546563.

*Primary Examiner*—Mark Zimmerman
*Assistant Examiner*—Kimbinh T. Nguyen
*Attorney, Agent, or Firm*—Fitzpatrick, Cella, Harper & Scinto

[57] ABSTRACT

In order to enable plural users to share a virtual environment which includes not only simple shape data, but also data of an object having a highly complicated shape, a terminal equipment displays the virtual environment. The virtual environment is obtained when viewed by a user of the terminal equipment on the basis of tree-structure data composing the shape data, light space data and the like as components. The tree-structure data is changed when the shape data or the light space data is subjected to a process such as movement or the like. The changed information of the tree-structure data is transmitted to a server, and the server changes data in a data memory device based on the received changed information. The changed information is transmitted to another terminal equipment which displays the virtual environment obtained when viewed by the user of the another terminal equipment on the basis of the received changed information.

36 Claims, 33 Drawing Sheets

FIG. 2

| 201 | INITIAL TREE CONDITION | | | | | |
|---|---|---|---|---|---|---|
| 202 | | ATTRIBUTE FIELD | | | | |
| | OBJECT NUMBER | LOCK USER NUMBER | POSITION DATA | SHAPE DATA | SURFACE ATTRIBUTE DATA | LIGHT SPACE DATA | .... |
| 203 | | ATTRIBUTE FIELD | | | | |
| | OBJECT NUMBER | LOCK USER NUMBER | POSITION DATA | SHAPE DATA | SURFACE ATTRIBUTE DATA | LIGHT SPACE DATA | .... |
| ⋮ | | | | | | |
| 204 | | ATTRIBUTE FIELD | | | | |
| | OBJECT NUMBER | LOCK USER NUMBER | POSITION DATA | SHAPE DATA | SURFACE ATTRIBUTE DATA | LIGHT SPACE DATA | .... |
| 205 | MAXIMUM OBJECT RECORD VALUE | | | | | |

| | | | |
|---|---|---|---|
| USER NUMBER | LATEST OBJECT NUMBER | LATEST USER NUMBER | ATTRIBUTE DATA |
| USER NUMBER | LATEST OBJECT NUMBER | LATEST USER NUMBER | ATTRIBUTE DATA |
| ⋮ | | | |
| USER NUMBER | LATEST OBJECT NUMBER | LATEST USER NUMBER | ATTRIBUTE DATA |
| MAXIMUM USER RECORD VALUE | | | |

Labels: 202a OBJECT NUMBER, 202b LOCK USER NUMBER, 202c ATTRIBUTE FIELD, 202c1 POSITION DATA, 202c2 SHAPE DATA, 202c3 SURFACE ATTRIBUTE DATA, 202c4 LIGHT SPACE DATA; 206 USER NUMBER, 206a, 206b LATEST OBJECT NUMBER, 206c LATEST USER NUMBER, 206d ATTRIBUTE DATA; 207, 208, 209 MAXIMUM USER RECORD VALUE.

FIG. 27

```
Separator {
    Separator {
        Transform {
            COORDINATE TRANSFORMATION $T_1$
        }
        Camera {
            INFORMATION ON POSITION, ANGLE OF VIEW AND THE LIKE
        }
    }
    Separator {
        Transform {
            COORDINATE TRANSFORMATION $T_2$
        }
        ShapeModel
            SHAPE OF ROOM
    }
    Separator {
        Transform {
            COORDINATE TRANSFORMATION $T_3$
        }
        ShapeModel
            SHAPE OF TABLE
        }
        Separator {
            Transform {
                COORDINATE TRANSFORMATION $T_5$
            }
            ShapeModel
                SHAPE OF POT
            }
        }
        Separator {
            Transform {
                COORDINATE TRANSFORMATION $T_6$
            }
            LIGHT SPACE DATA {
                OBJECT
            }
        }
    }
    Separator {
        Transform {
            COORDINATE TRANSFORMATION $T_4$
        }
        ShapeModel
            SHAPE OF SOFA
        }
    }
}
```

REAL SPACE (X, Z)

LIGHT SPACE (x, u)
(WHERE $u = \tan \phi$)

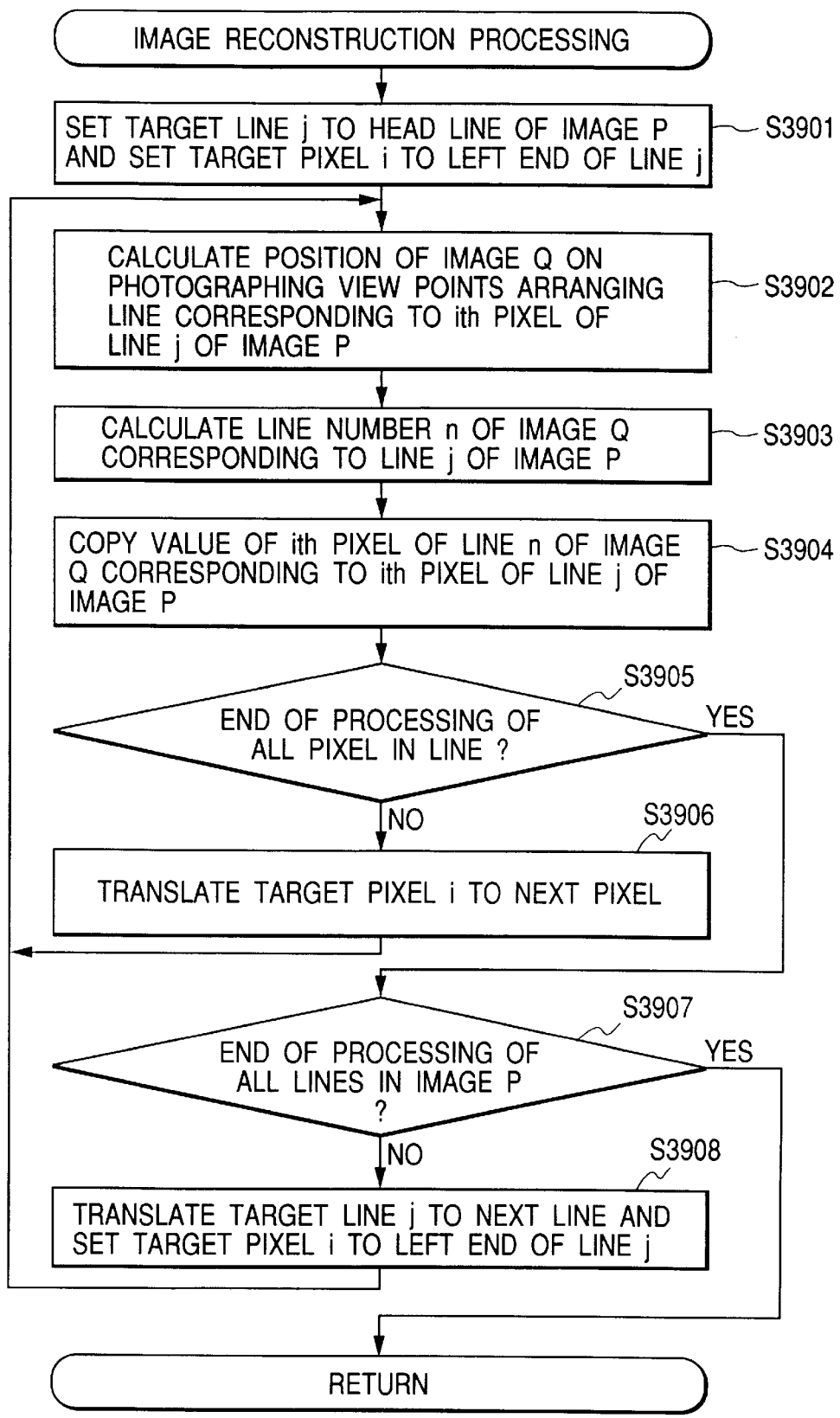

IMAGE PROCESSING APPARATUS, METHOD AND SYSTEM

BACKGROUND OF THE INVENTION

1. Field of the Invention

The present invention relates to image processing apparatus, method and system in which a virtual environment for virtual reality is generated, and the generated virtual environment is shared by plural users.

2. Related Background Art

Conventionally, there has been provided a method to express a three-dimensional object and space and provide an observation image at an arbitrary position and direction.

In this method (1), the three-dimensional object and space are expressed by using shape model data such as polygon data, curved surface data or the like, texture data representing a surface attribute or pattern of the image, light source data and the like, and a view state (or appearance) of the space in the arbitrary position and direction is sketched on a display screen, whereby the three-dimensional space and object are reproduced.

In case of constructing a three-dimensional virtual environment by this method, there is a method to express elements (coordinate conversion data, shape data, surface attribute data, illumination and the like) composing such the virtual environment by means of a tree structure. This is because the space, the ground, buildings, rooms, furniture, illuminators, ornaments and the like composing the three-dimensional space are considered to be essentially in a hierarchical nested relation. For example, since an ornament on a desk is moved according to an arrangement of the desk, the ornament is in a relation depending on the arrangement of the desk. Therefore, it is often more convenient for the ornament to be relatively arranged based on a coordinate system in which the desk exists, thereby applying the data structure in which the arrangements of the elements are in the hierarchically dependent relation. As a method to do so, the virtual environment is expressed by a n-tree structure.

For example, FIG. 42 shows an example of one simple virtual environment. In this case, if it pays attention to a room, a desk and a sofa in the space, the room is described on a coordinate system $C_2$ converted from a world coordinate system $C_0$ through a coordinate conversion $T_2$, and the desk and the sofa in this room are respectively described on coordinate systems $C_3$ and $C_4$ respectively converted from the coordinate system $C_2$ through coordinate conversions $T_3$ and $T_4$. Further, a pot on the desk is described on a coordinate system $C_5$ converted from the coordinate system $C_3$ through a coordinate conversion $T_5$. FIG. 43 shows a tree structure schematically expressing such relation.

Further, there is a method (2) in which the light space data is generated based on an image group obtained by real-photographing the three-dimensional object and space, wherein the visible image in arbitrary position and direction is formed based on the generated light space data, and the formed image is displayed to reproduce the three-dimensional object and space. In this method, a shape of an object is not obtained, but the object is reproduced as a set (or gather) of light.

Furthermore, there is provided a method to perform cooperative working by plural users.

In this method (3), a data memory device storing data common to the plural users and a server device for managing processing on the data memory device are provided, and each user communicates with the server device to refer to and change the data stored in the data memory device or each user directly communicates with other users with respect to the change of the data in the data memory device, thereby maintaining the data of each user in the same state.

Furthermore, there is provided a method (4) that, by utilizing the method (3) to perform the cooperative working and the method (1) to express the virtual environment, the state of the virtual environment consisting of geometrical shape data is maintained to be identical, whereby the virtual environment is shared by the plural users.

However, in the above-described conventional methods (1) to (4), there are the following problems.

In the method (1), it is difficult to generate or reproduce the shape data for an object having a shape which is highly complicated. Further, it is also difficult to capture, from a real object, the shape data of this object of having a complicated shape by using a three-dimensional measurement device. Especially, it is more difficult to reproduce the real object having the already-existent complicated shape or surface pattern or a complicated reflection characteristic (i.e., absorption transmission characteristic). In addition, generally, it is easy to express an artificial object but difficult to express a natural object. However, in this method, there is an advantage that the artificial and simple three-dimensional space such as the room or a row of houses (or street) which is mainly composed of different planes can be expressed by a small data amount. Further, the method to express the virtual environment by using the tree structure is an excellent method.

In the method (2), when the light space data and is generated from a photographed image of a certain amount, then an observation image at an arbitrary viewpoint position (although including restricted condition) can be formed. Since the shape of the object is not restored and the object is described based on the photographed image of the object itself, this method is an excellent method which can express the object in a highly realistic manner. However, since the large data amount is necessary and the photographing becomes difficult when the object has a wide range, this method is suitable to describe the three-dimensional object rather than the wide space. That is, this method is not suitable to express the three-dimensional space such as the room or the row of the houses.

Further, the above conventional methods (1) and (2) have the different features respectively. However, in the conventional method (4), the method or technique which is combined with the method (3) to realize the common virtual space is only the method (1) of which the data amount is small. That is, the method (2) could not be used in the method (4) because of its large data amount. For this reason, the common virtual environment realized by the method (4) comes to include the feature in the method (1), whereby the common virtual environment becomes the virtual environment which can not include the object such as the natural object having a shape which is highly complicated.

SUMMARY OF THE INVENTION

An object of the present invention is to enable plural users to share a virtual environment including simple shape data and highly complicated shape data.

In order to achieve the above object, an image processing apparatus according to the present invention comprises:

a tree-structure data memory means for storing tree-structure data, the tree-structure data including as components shape data geometrically describing a three-dimensional space and a three-dimensional object and light space data describing the three-dimensional space and the three-dimensional object based on a real-photographed image;

a displaying means for displaying a virtual three-dimensional space in which the shape data and the light space data are mixed with each other, based on the tree-structure data stored in the tree-structure data memory means;

a processing means for processing at least one of the both displayed shape data and the both displayed light space data;

a changing means for changing the tree-structure data stored in the tree-structure data memory means, based on the processing content by the processing means;

a re-displaying means for re-displaying the virtual three-dimensional space, based on the data changing content by the changing means;

an indication information generating means for generating indication information indicating the changing content of the tree-structure data, based on the processing content by the processing means; and a transmitting means for transmitting the indication information generated by the indication information generating means to another information processing apparatus connected to the image processing apparatus.

Further, in order to achieve the above object, an image processing apparatus according to the present invention comprises:

a tree-structure data memory means for storing tree-structure data, the tree-structure data including as components shape data geometrically describing a three-dimensional space and a three-dimensional object and light space data describing the three-dimensional space and the three-dimensional object based on a real-photographed image;

a displaying means for displaying a virtual three-dimensional space in which the shape data and the light space data are mixed with each other, based on the tree-structure data stored in the tree-structure data memory means;

a receiving means for receiving indication information indicating a changing content of the tree-structure data, transmitted from another information processing apparatus connected to the image processing apparatus;

a changing means for changing the tree-structure data stored in the tree-structure data memory means, based on the indication information received by the receiving means; and a re-displaying means for re-displaying the virtual three-dimensional space, based on the data changing content by the changing means.

Furthermore, in order to achieve the above object, an image processing method according to the present invention which is used in an image processing apparatus comprising a tree-structure data memory means for storing tree-structure data, the tree-structure data including as components shape data geometrically describing a three-dimensional space and a three-dimensional object and light space data describing the three-dimensional space and the three-dimensional object based on a real-photographed image, the method comprises:

a displaying step of displaying a virtual three-dimensional space in which the shape data and the light space data are mixed with each other, based on the tree-structure data stored in the tree-structure data memory means;

a processing step of processing at least one of the both displayed shape data and the light space data;

a changing step of changing the tree-structure data stored in the tree-structure data memory means, based on the processing content in the processing step;

a re-displaying step of re-displaying the virtual three-dimensional space, based on the data changing content in the changing step;

an indication information generating step of generating indication information indicating the changing content of the tree-structure data, based on the processing content in the processing step; and a transmitting step of transmitting the indication information generated in the indication information generating step to another information processing apparatus connected to the image processing apparatus.

Furthermore, in order to achieve the above object, an image processing method according to the present invention which is used in an image processing apparatus comprising a tree-structure data memory means for storing tree-structure data, the tree-structure data including as components shape data geometrically describing a three-dimensional space and a three-dimensional object and light space data describing the three-dimensional space and the three-dimensional object based on a real-photographed image, the method comprises:

a displaying step of displaying a virtual three-dimensional space in which the shape data and the light space data are mixed with each other, based on the tree-structure data stored in the tree-structure data memory means;

a receiving step of receiving indication information indicating a changing content of the tree-structure data, transmitted from an another information processing apparatus connected to the image processing apparatus;

a changing step of changing the tree-structure data stored in the tree-structure data memory means, based on the indication information received in the receiving step; and a re-displaying step of re-displaying the virtual three-dimensional space, based on the data changing content in the changing step.

Furthermore, in order to achieve the above object, a computer-readable memory medium according to the present invention which is used in an image processing apparatus comprising a tree-structure data memory means for storing tree-structure data, the tree-structure data including as components shape data geometrically describing a three-dimensional space and a three-dimensional object and light space data describing the three-dimensional space and the three-dimensional object based on a real-photographed image, and which stores a computer program including:

a displaying module for displaying a virtual three-dimensional space in which the shape data and the light space data are mixed with each other, based on the tree-structure data stored in the tree-structure data memory means;

a processing module for processing at least one of the both displayed shape data and the both displayed light space data;

a changing module for changing the tree-structure data stored in the tree-structure data memory means, based on the processing content in the processing step;

a re-displaying module for re-displaying the virtual three-dimensional space, based on the data changing content;

an indication information generating module for generating indication information indicating the changing content of the tree-structure data, based on the processing content; and a transmitting module for transmitting the generated indication information to another information processing apparatus connected to the image processing apparatus.

Furthermore, in order to achieve the above object, a computer-readable memory medium according to the present invention which is used in an image processing apparatus comprising a tree-structure data memory means for storing tree-structure data, the tree-structure data including as components shape data geometrically describing a three-dimensional space and a three-dimensional object and light space data describing the three-dimensional space and the three-dimensional object based on a real-photographed image, and which stores a computer program including:

a displaying module for displaying a virtual three-dimensional space in which the shape data and the light space data are mixed with each other, based on the tree-structure data stored in the tree-structure data memory means;

a receiving module for receiving indication information indicating a changing content of the tree-structure data, transmitted from an another information processing apparatus connected to the image processing apparatus;

a changing module for changing the tree-structure data stored in the tree-structure data memory means, based on the received indication information; and a re-displaying module for re-displaying the virtual three-dimensional space, based on the data changing content.

Furthermore, in order to achieve the above object, an image processing system according to the present invention in which a first terminal equipment is connected to a second terminal equipment through a server, comprises:

the first terminal equipment further comprising, a first tree-structure data memory means for storing tree-structure data, the tree-structure data including as components shape data geometrically describing a three-dimensional space and a three-dimensional object and light space data describing the three-dimensional space and the three-dimensional object based on a real-photographed image, a first displaying means for displaying a virtual three-dimensional space in which the shape data and the light space data are mixed with each other, based on the tree-structure data stored in the first tree-structure data memory means, a processing means for processing at least one of the both displayed shape data and the light space data, a first changing means for changing the tree-structure data stored in the first tree-structure data memory means, based on the processing content by the processing means, a first re-displaying means for re-displaying the virtual three-dimensional space, based on the data changing content by the first changing means, an indication information generating means for generating indication information indicating the changing content of the tree-structure data, based on the processing content by the processing means, and a first transmitting means for transmitting the indication information generated by the indication information generating means to the server connected to the first terminal equipment;

the server further comprising, a first receiving means for receiving the indication information transmitted from the first terminal equipment, and a second transmitting means for transmitting the indication information received by the first receiving means to the second terminal equipment; and the second terminal equipment further comprising, a second tree-structure data memory means for storing tree-structure data, the tree-structure data including as components shape data geometrically describing a three-dimensional space and a three-dimensional object and light space data describing the three-dimensional space and the three-dimensional object based on a real-photographed image, a second displaying means for displaying a virtual three-dimensional space in which the shape data and the light space data are mixed with each other, based on the tree-structure data stored in the second tree-structure data memory means, a second receiving means for receiving indication information indicating a changing content of the tree-structure data, transmitted from the server connected to the second terminal equipment, a second changing means for changing the tree-structure data stored in the second tree-structure data memory means, based on the indication information received by the second receiving means, and a second re-displaying means for re-displaying the virtual three-dimensional space, based on the data changing content by the second changing means.

Furthermore, in order to achieve the above object, an image processing system according to the present invention in which a first terminal equipment and a second terminal equipment are connected to each other, comprises:

the first terminal equipment further comprising, a first tree-structure data memory means for storing tree-structure data, the tree-structure data including as components shape data geometrically describing a three-dimensional space and a three-dimensional object and light space data describing the three-dimensional space and the three-dimensional object based on a real-photographed image, a first displaying means for displaying a virtual three-dimensional space in which the shape data and the light space data are mixed with each other, based on the tree-structure data stored in the first tree-structure data memory means, a processing means for processing at least one of the both displayed shape data and the light space data, a first changing means for changing the tree-structure data stored in the first tree-structure data memory means, based on the processing content by the processing means, a first re-displaying means for re-displaying the virtual three-dimensional space, based on the data changing content by the first changing means, an indication information generating means for generating indication information indicating the changing content of the tree-structure data, based on the processing content by the processing means, and a transmitting means for transmitting the indication information generated by the indication information generating means to the second terminal equipment connected to the first terminal equipment; and the second terminal equipment further comprising, a second tree-structure data memory means for storing tree-structure data, the tree-structure data including as components shape data geometrically describing a three-dimensional space and a three-dimensional object and light space data describing the three-dimensional space and the three-dimensional object based on a real-photographed image, a second displaying means for displaying a virtual three-dimensional space in which the shape data and the light space data are mixed with each other, based on the tree-structure data stored in the second tree-structure data memory means, a receiving means for receiving indication information indicating a changing content of the tree-structure data, transmitted from the first terminal equipment connected to the second terminal equipment, a second changing means for changing the tree-structure data stored in the second tree-structure data memory means, based on the indication information received by the receiving means, and a second re-displaying means for re-displaying the virtual three-dimensional space, based on the data changing content by the second changing means.

BRIEF DESCRIPTION OF THE DRAWINGS

FIG. 2 is a view showing the structure of a data memory device 101 included in a server device 102;

FIG. 27 is a view showing text data expressing the tree structure in FIG. 26;

FIG. 39 is a flow chart showing processing that the image is formed from the multi-viewpoint image used in the second embodiment;

DETAILED DESCRIPTION OF THE PREFERRED EMBODIMENTS (First Embodiment)

Figure 1:
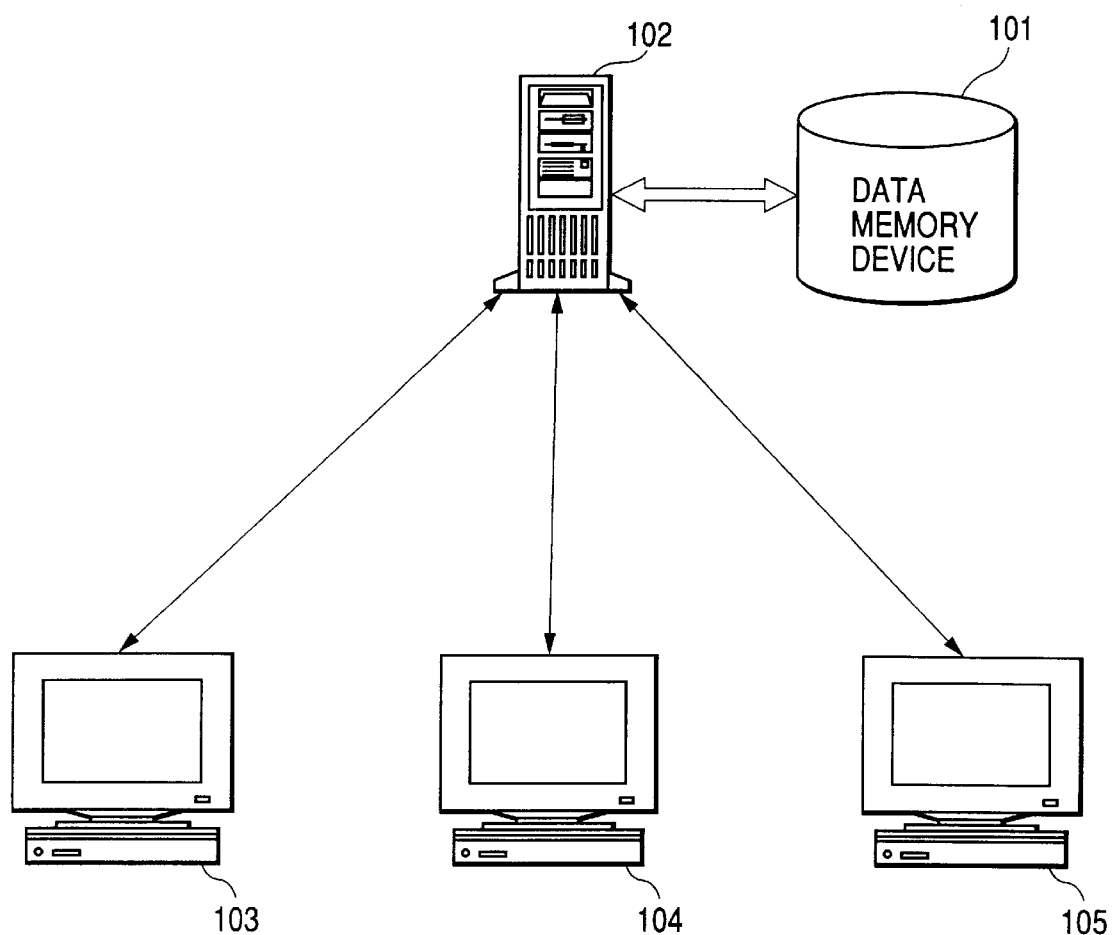
FIG. 1 is a block diagram showing a first embodiment.

FIG. 1 is a block diagram showing a shared virtual environment generating system in the first embodiment.

Reference numeral 101 denotes a data memory device which stores data representing a state of a shared virtual environment, and reference numeral 102 denotes a server device which manages changing of the data representing the state of the shared virtual environment. Contents of the data memory device 101 can be changed only responsive to an instruction from the server device 102. Reference numerals 103 to 105 denote terminal equipments each having an interface device. In the first embodiment, the interface device displays the state of the shared virtual environment to users, and also transmits to the server device 102 an instruction to change the data representing the state of the shared virtual environment.

In the first embodiment, it is assumed that the data memory device 101 is provided within the server device 102. However, the data memory device 101 may be provided anywhere on a network to which the server device 102 and the terminal equipments 103 to 105 are connected.

FIG. 2 shows the data structure in the data memory device 101.

Reference numeral 201 denotes information representing an initial tree state. As the information 201, data representing an initial state of the shared virtual environment is stored when the server device 102 is initiated. Reference numerals 202 to 204 denote object records respectively including information of objects existing in the shared virtual environment. The object record 202 is composed of an object number 202a representing a number of the object, a lock user number 202b representing a number of the user who is locking the object, and an attribute filed 202c including various data concerning the object. Concretely, the attribute filed 202c includes position data 202c1 representing position and direction of the object in a world coordinate system or position and direction of the object in the tree of the shared virtual environment, shape data 202c2 representing a geometrical shape of the object, surface attribute data 202c3 representing a surface reflection coefficient of the object or the like, and light space data 202c4 of the object. Similarly, each of the object records 203 and 204 is composed of an object number, a lock user number and an attribute field.

Reference numeral 205 denotes a maximum object record value. As the value 205, the maximum object number in the object records existing within the data memory device 101 is stored.

Reference numerals 206 to 208 denote user records which respectively include information of the users common to the virtual environment. The user record 206 is composed of a user number 206a representing a number of the user, a latest object number 206b representing the latest object of which state is held by the user, a latest user number 206c representing the latest user holding the state, and attribute data 206d representing the state of position, direction and the like of a user's viewpoint. Similarly, each of the user records 207 and 208 is composed of a user number, a latest object number, a latest user number and an attribute data.

Reference numeral 209 denotes a maximum user record value. As the value 209, the maximum user number is stored in the user records existing in the data memory device 101.

Figure 3:
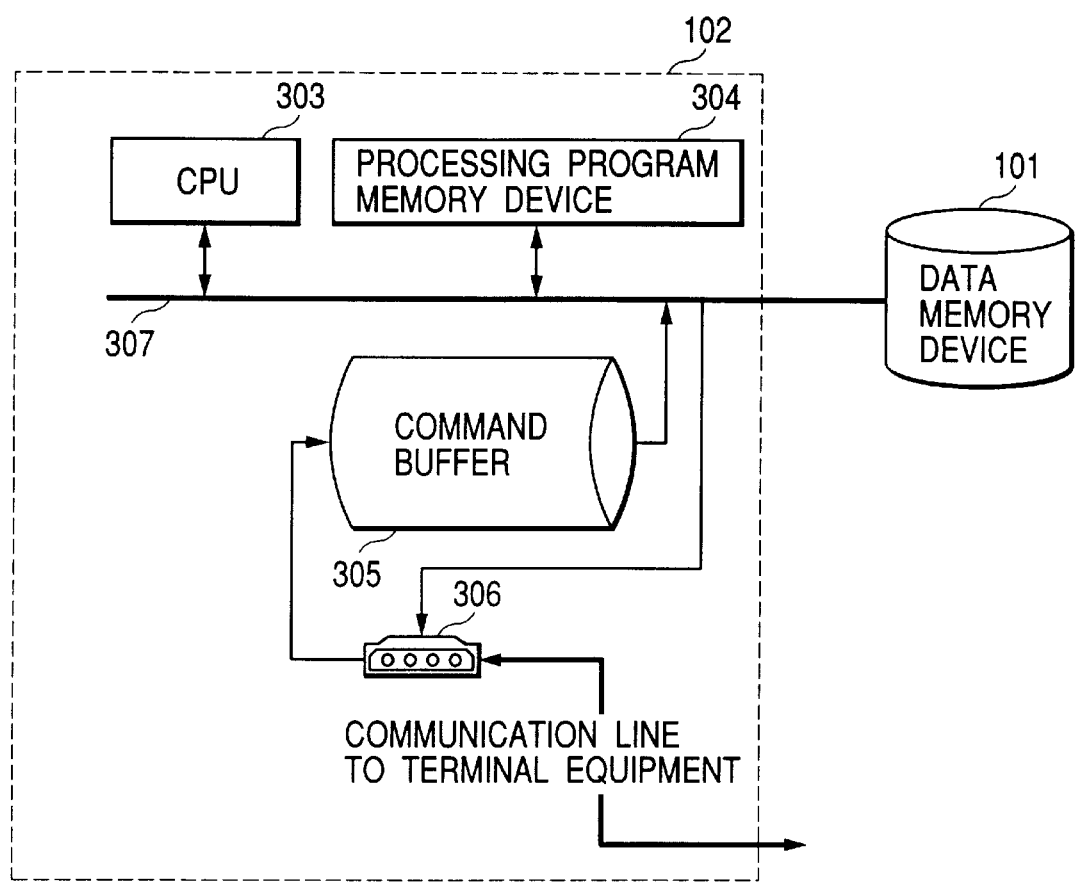
FIG. 3 is a block diagram showing the structure of the server device 102.

FIG. 3 shows the internal structure of the server device 102.

Reference numeral 303 denotes a CPU which executes a processing procedure, and reference numeral 304 denotes a processing program memory device which stores the processing procedure. Reference numeral 305 denotes a first-in first-out command buffer which temporarily stores a command transmitted from the terminal equipment. Reference numeral 306 denotes an interface which is used to receive the command from the terminal equipment and transmit the data to the terminal equipment. Further, reference numeral 307 denotes a bus which connects the above units to others.

Figure 4:
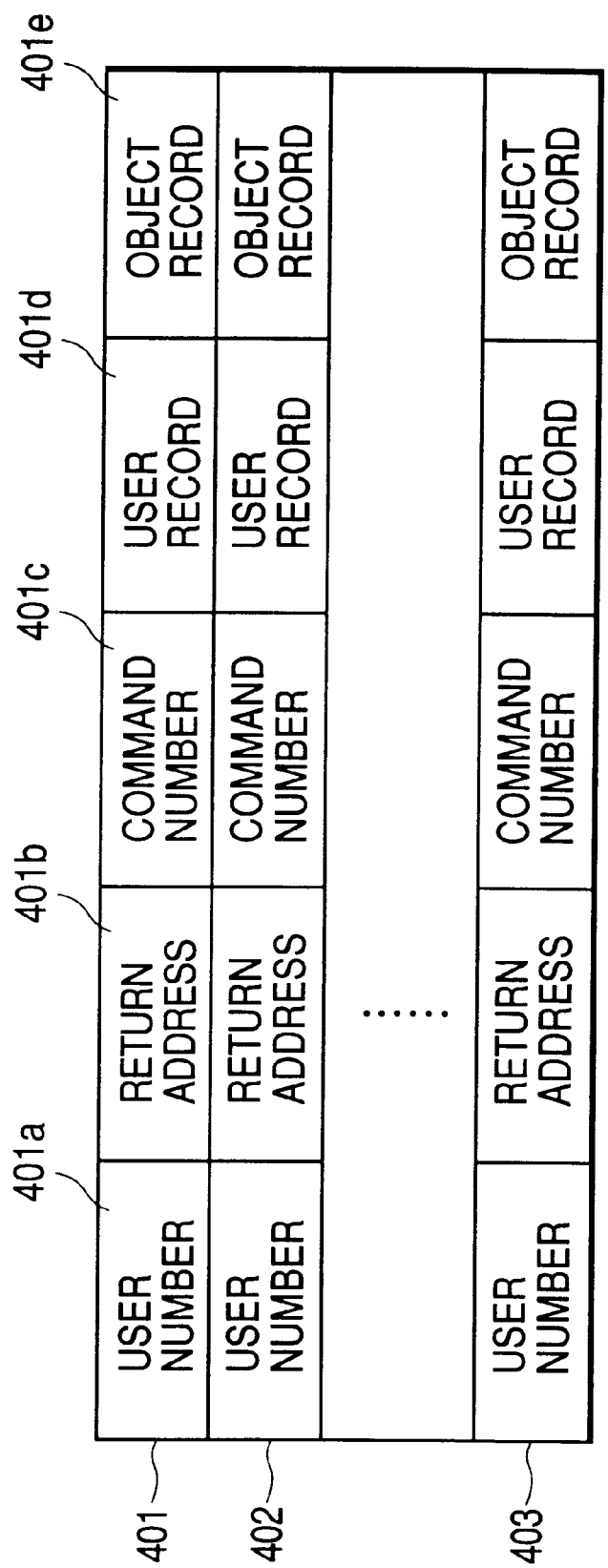
FIG. 4 is a view showing the structure of a command buffer 305.

FIG. 4 shows the internal structure of the command buffer 305.

The commands transmitted from plural communication terminals are sequentially stored in the command buffer 305. The CPU 303 fetches the command from the leading position of the buffer one by one and then processes the fetched command. Reference numerals 401, 402 and 403 denote commands transmitted respectively from the terminal equipments.

The structure of the command 401 will be explained. A user number 401a represents a user number of the terminal equipment which transmitted the command. A return address 401b represents an address to be used as a transmission destination when the server device 102 replies to the command. A command number 401c represents a kind of the command. A user record 401d represents the user record which is referred to or changed by the command 401. Further, an object record 401e represents the object record which is referred to or changed by the command 401. Since all the data are not always necessary for all the kinds of the commands, unnecessary data can be omitted or cancelled.

Figure 5:
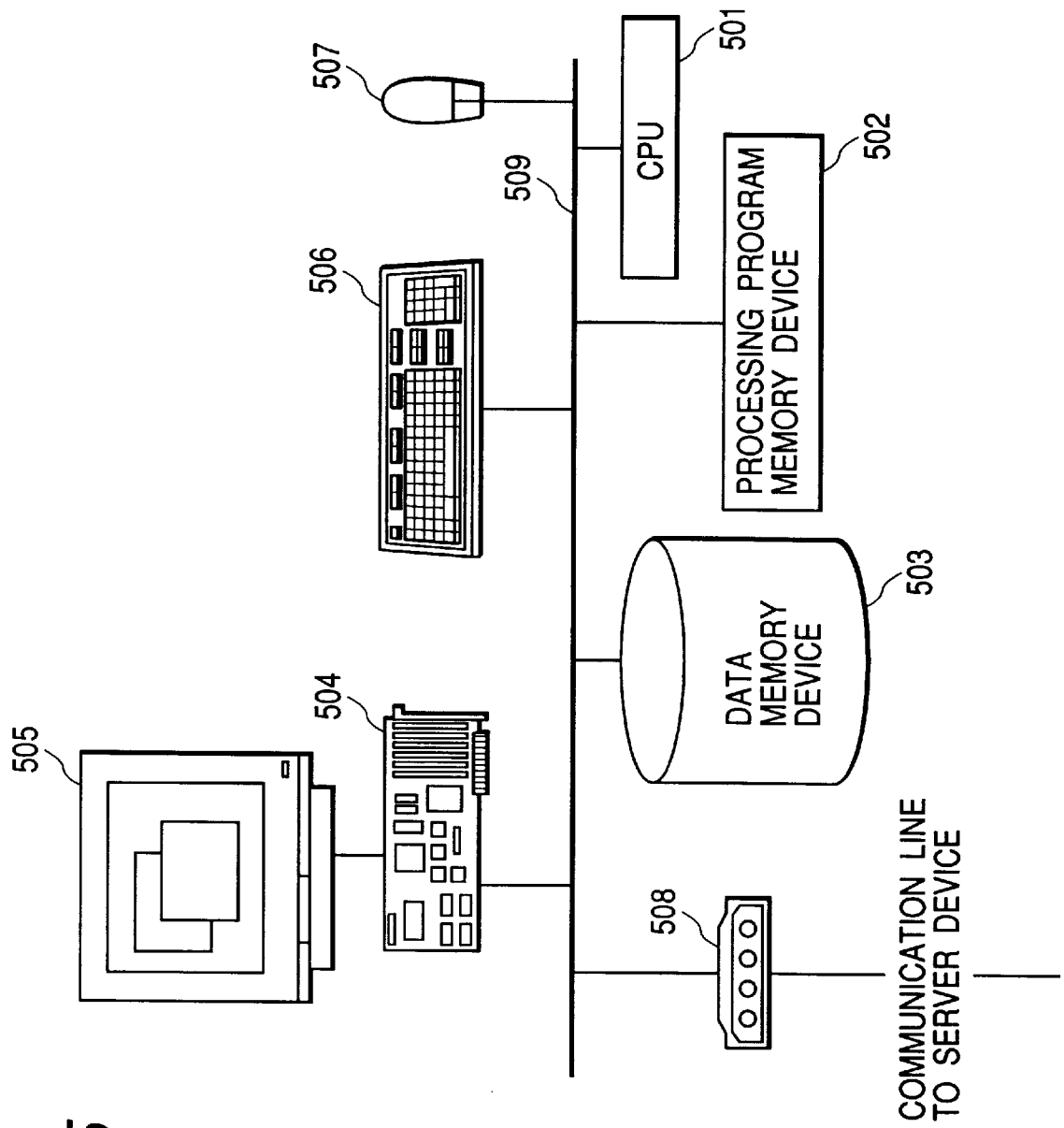
FIG. 5 is a view showing the structure of a terminal equipment.

FIG. 5 shows the internal structure of the terminal equipment 103. It should be noted that the internal structures of the terminal equipments 104 and 105 are identical with that of the terminal equipment an 103.

Reference numeral 501 denotes a CPU which executes a processing procedure on the side of the terminal equipment in the first embodiment. Reference numeral 502 denotes a processing program memory device which stores the processing procedure. Reference numeral 503 denotes a data memory device which holds the data representing the state of the shared virtual environment. The data is shared by the data memory device 503 and the data memory device 101 on the side of the server device 102. Reference numeral 504 denotes a frame buffer which stores images representing the course of processing and the processed results such that these images can be sent to a display device. Reference numeral 505 denotes a window system which acts as the display device to display the images in the frame buffer 504. Reference numeral 506 denotes a keyboard which inputs characters and instructions in the course of processing. Reference numeral 507 denotes a mouse which is used to designate a position on a display screen. Reference numeral 508 denotes an interface device which is used to transmit the command to the server device 102 and receive the data from the server device 102. Further, reference numeral 509 denotes a bus which connects the above units to others.

Figure 6:
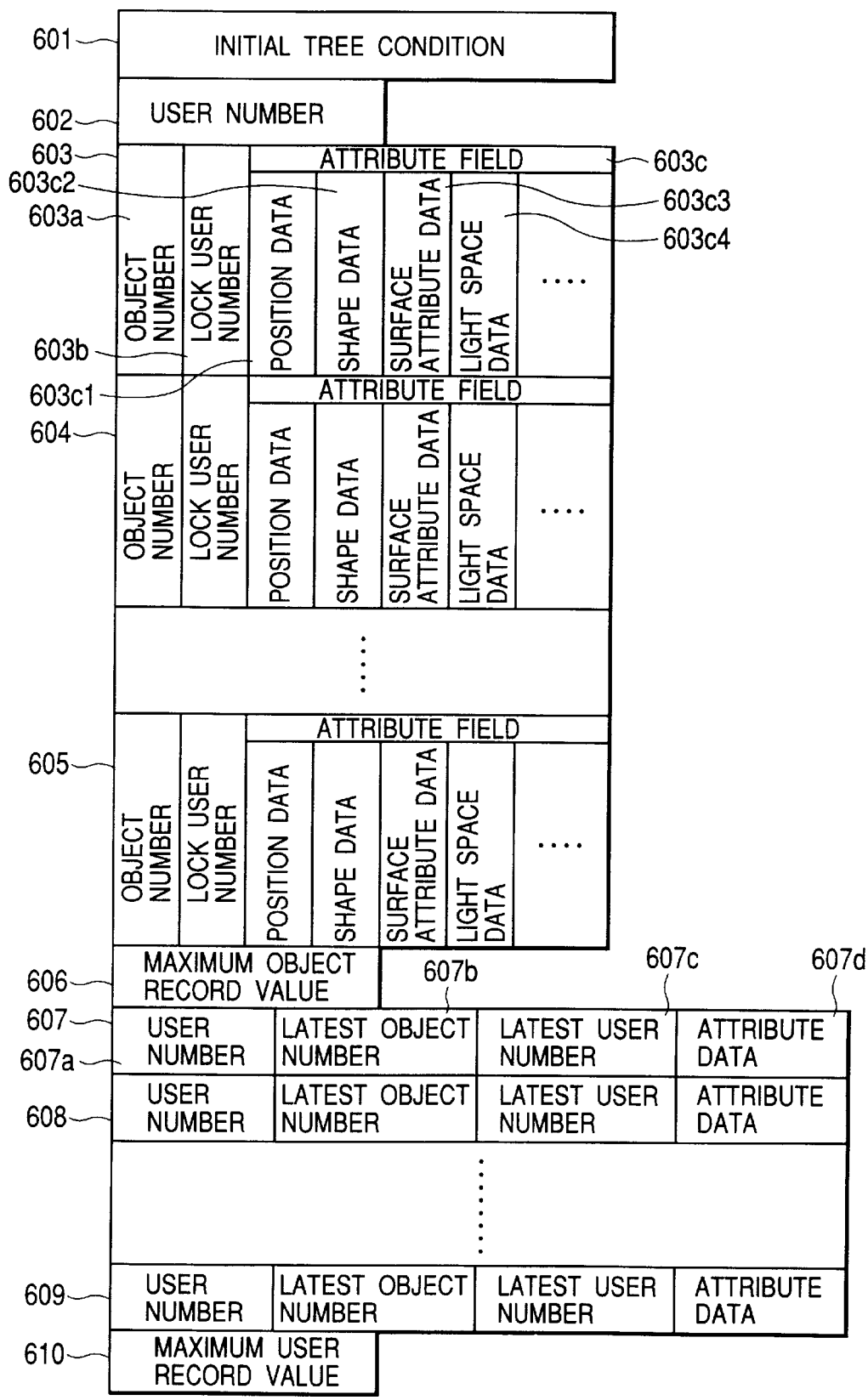
FIG. 6 is a view showing the structure of a data memory device 503 included in the terminal equipment.

FIG. 6 shows the data structure of the data memory device 503.

Reference numerals 601 and 603 to 610 respectively denote the same elements as the corresponding elements in the data structure of the data memory device 101 shown in FIG. 2. The content of the data memory device 503 in each terminal equipment is maintained to be substantially identical with that of the data memory device 101 on the side of the server device 102 through communication between the server device 102 and the terminal equipment. As a user number 602, a number which is given by the server device 102 at the time of initializing the terminal equipment is stored.

Hereinafter, the processing on the side of the server device 102 in the first embodiment will be explained with reference to flow charts shown in FIGS. 7 to 19. The processing program for such processing has been stored in the processing program memory device 304, and is executed by the CPU 303.

Figure 7:
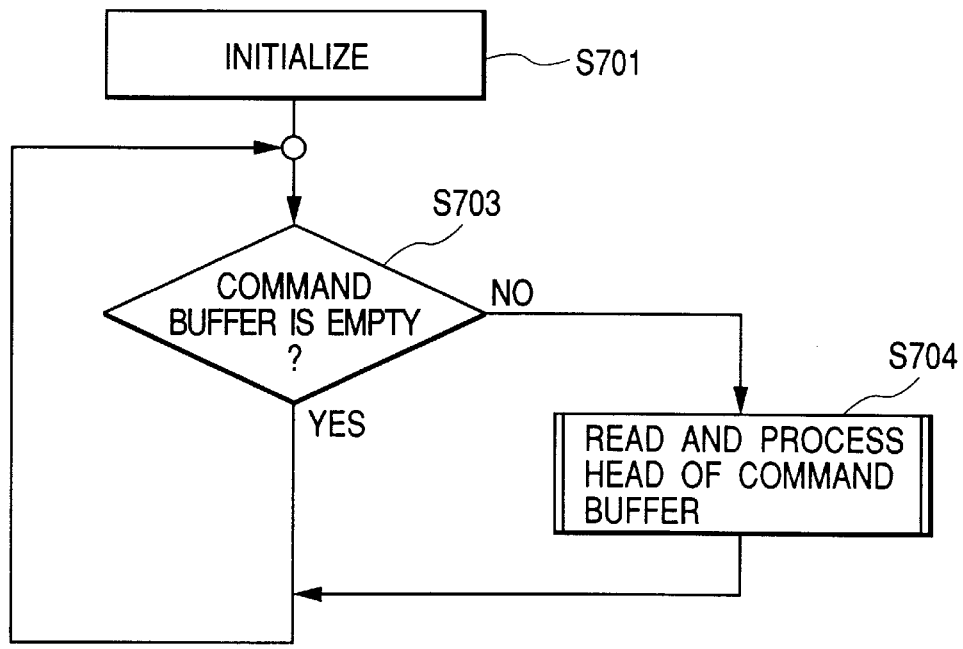
FIG. 7 is a flow chart showing processing by the server device 102 in the first embodiment.

FIG. 7 is the flow chart showing the processing by the server device 102 in the first embodiment.

Initially, the data memory device 101 is initialized in a step S701. Concretely, after deleting all the object records and the user records, the information 201 representing the initial tree state is read. In the information 201 representing the initial tree state, geometrical shape data having the surface attribute data, or light space data is included. This information 201 can be previously generated by using some device such as an already-existent modeler or the like.

As the shape data, there are polygon data such as a triangular patch, free curved surface data such as NURBS, or the like. The surface attribute data represents a material, a reflection characteristic, a pattern and the like of the shape. The pattern is input as texture data. The texture data represents the pattern on the surface of the polygon data, the free curved surface data or the like, and describes a positional relation between the pattern image data and the shape being the object to which the pattern or image is pasted.

Figure 34A:
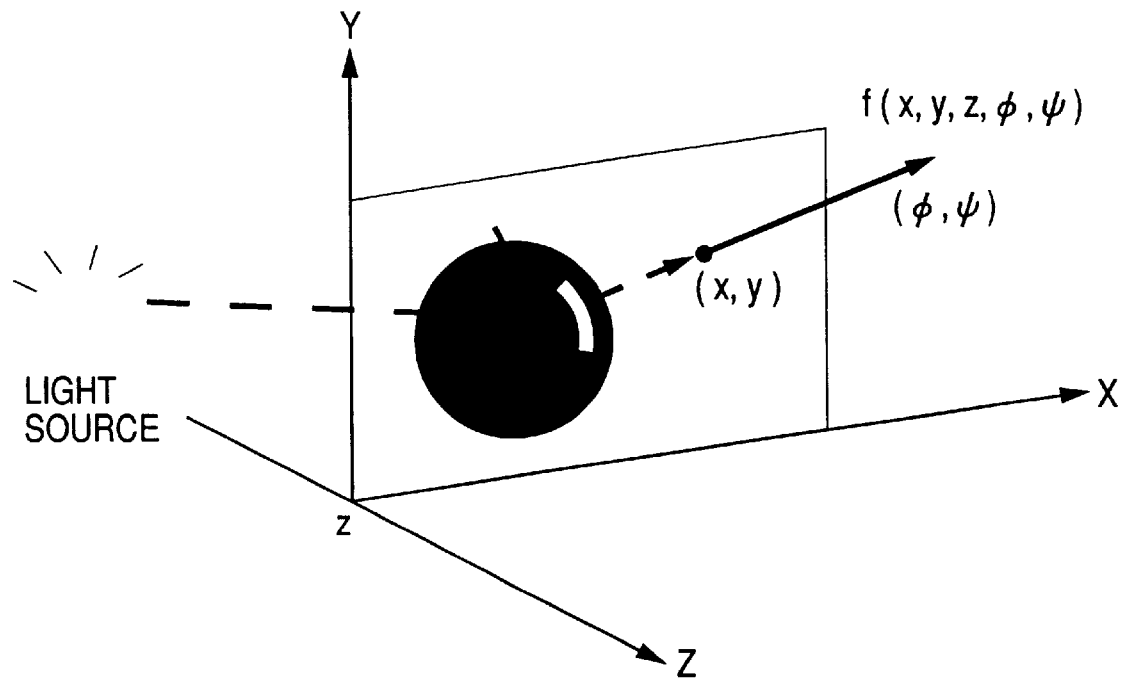
FIGS. 34A and 34B are schematic views showing a three-dimensional space to explain a principle of a light space.
Figure 34B:
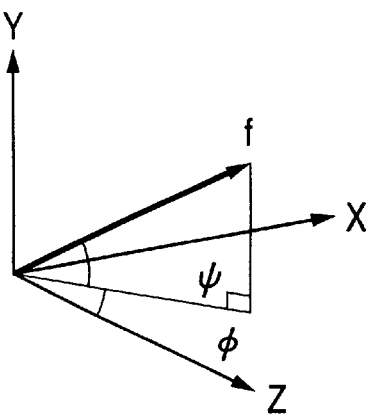

If a plane of z=0 in a coordinate system shown in FIGS. 34A and 34B is assumed, the light space data expresses the three-dimensional space as a set (or gather) of light passing through this plane (referred as standard plane 34 hereinafter).

Figure 35:
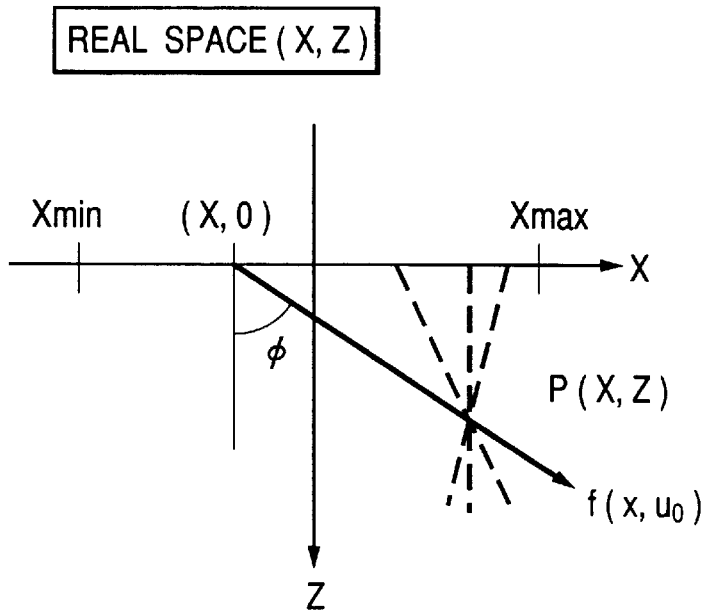
FIG. 35 is a view showing relation between one point in a real space and light passing through the point.
Figure 36:
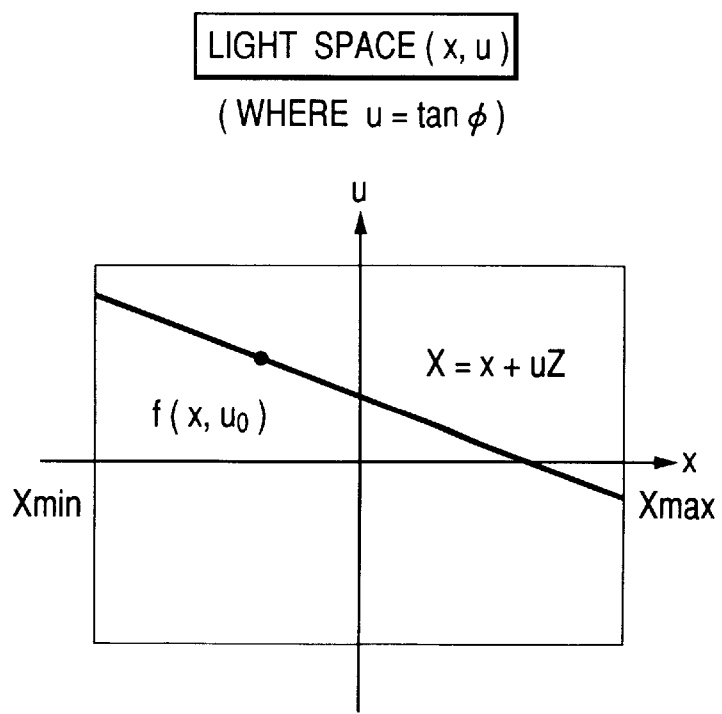
FIG. 36 is a view showing mapping that the light passing through one point in the real space is mapped to an x-u space being the light space.

In the method which uses this light space data, the image which can be observed at a viewpoint position P on a point z in the three-dimensional space is equivalent to the image which can be obtained by sampling only the light passing through the position P from the set of the light passing through the standard plane 34 (see FIG. 35). Generally, each light is represented by a position (x,y) on the standard plane 34 through which the light passes, an angle φ between the light and an x axis, an angle ψ between the light and a y axis, a time t when the light passes through the plane and a color (r,g,b) of the light. However, because of a problem that a calculating amount and a data amount becomes huge, actually it is often assumed that the object is a still object and there is no parallax in a y-axis direction. Under this assumption, u=tan φ is set and each light is projected on an x-u space. In a case where a light space is handled by using the x-u space on which the light was projected, the light passing through one point (viewpoint position) P has a liner locus as shown in FIG. 36. This locus is expressed by the following equations.

$$x = X - Z \cdot u \quad (1)$$

$$u = \tan \phi \quad (2)$$

Here, reference symbol (X,Z) denotes an observation viewpoint position, reference symbol x denotes a position at which the light crosses the x axis in the x-u space, and reference symbol φ denotes the angle between the light and the z axis.

Figure 37A:
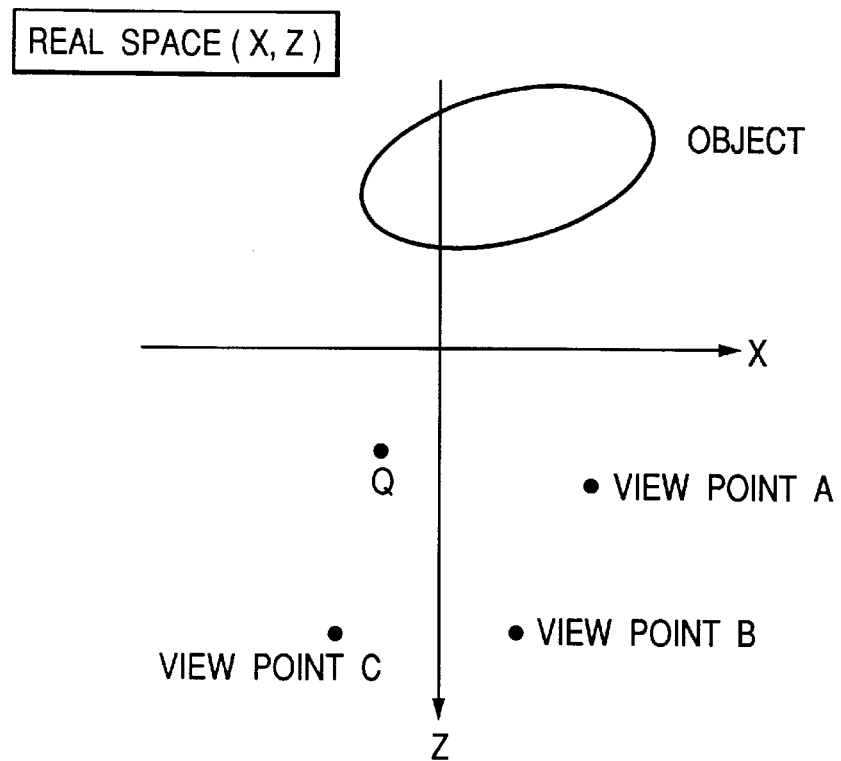
FIGS. 37A and 37B are views showing a principle of mutual conversion between the real space and the light space.
Figure 37B:
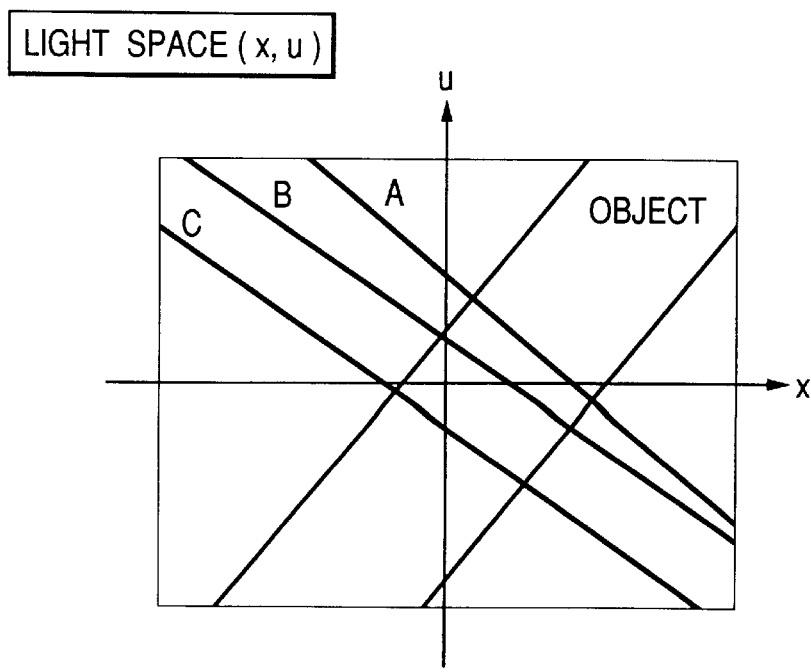

Initially, as shown in FIGS. 37A and 37B, the linear loci are obtained from the image obtained at numerous viewpoint positions, and it is assumed that the x-u space is densely filled with a group of these loci. At this time, as shown in FIGS. 37A and 37B, if the locus passing through the position Q in the x-u space is obtained and the color of the light already recorded on this locus is inversely obtained, the image at a viewpoint position Q on the point z can be obtained.

Subsequently, the processing after terminating the initializing of the server device 102 in the step S701 will be explained. The server device 102 enters into a loop to wait for the command from the terminal equipment. Then, it is confirmed in a step S703 whether or not the command has been inputted in the command buffer 305 from the terminal equipment. If the command buffer 305 is empty, the server device 102 again enters into the loop to wait for the command from the terminal equipment. On the other hand, if the command buffer 305 is not empty, the flow advances to a step S704 to operate the data memory device 101 according to the command at the leading position in the buffer 305. As a result of the operation, when it becomes necessary to transmit the data to the terminal equipment, the data is transmitted through the interface 306. At this time, the data is transmitted to all the terminal equipments connected to the server device 102 such that all the terminal equipments have the identical data. After terminating the processing in the step S704, the server device 102 again enters into the loop to wait for the command from the terminal equipment.

There are 12 kinds of commands read from the command buffer 305 in the step S704, i.e., a user record addition command, a user record deletion command, a user record attribute inquiry command, a user record change command, a maximum user record value inquiry command, an object record addition command, an object record deletion command, an object record attribute inquiry command, an object record change command, an object record lock command, an object record unlock command, and a maximum object record value inquiry command. FIGS. 8 to 19 are the flow charts respectively showing the processing by the server device 102 at the respective times when the above 12 kinds of the commands are received.

Figure 8:
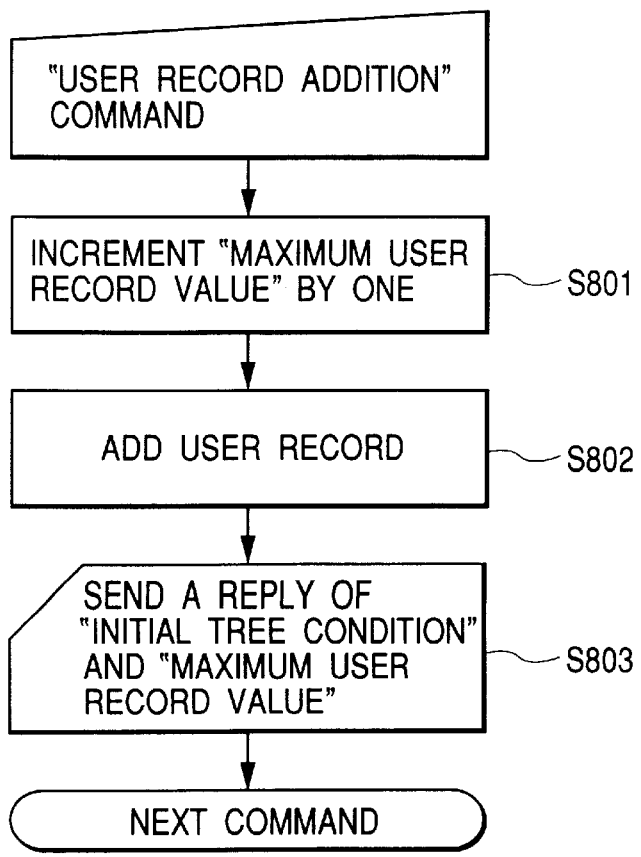
FIG. 8 is a flow chart showing the processing by the server device 102 when a user record addition command is received.

FIG. 8 is the flow chart showing the processing by the server device 102 at the time when the user record addition command is received. In a step S801, the maximum user record value 209 in the data memory device 101 is increased by one. Then, in a step S802, a new user record is formed in the data memory device 101. In this case, as the user number of the new record, the maximum user record value 209 is stored. Finally, in a step S803, the information 201 representing the maximum user record value 209 and the initial tree state is returned.

Figure 9:
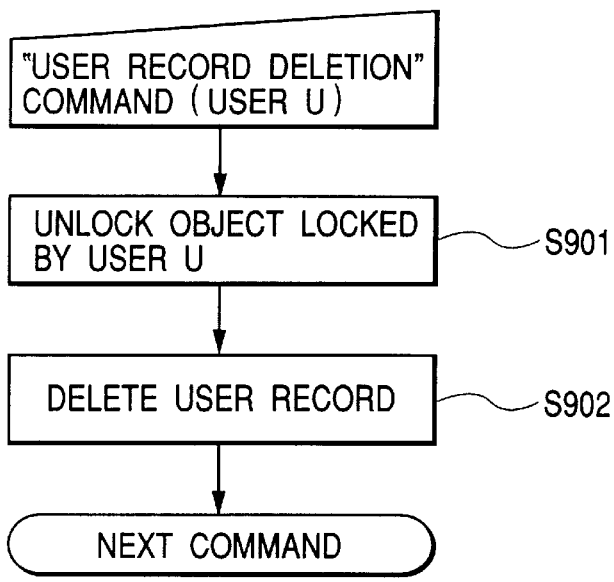
FIG. 9 is a flow chart showing the processing by the server device 102 when a user record deletion command is received.

FIG. 9 is the flow chart showing the processing by the server device 102 at the time when the user record deletion command is received. When the user record deletion command is received from a user U, in a step S901, lock user numbers of all the user records included in the data memory device 101 are checked, and the lock user number of the user record which is being locked by the user U is set to be "0". Finally, in a step S902, the user record corresponding to the user U is deleted from the data record device 101.

Figure 10:
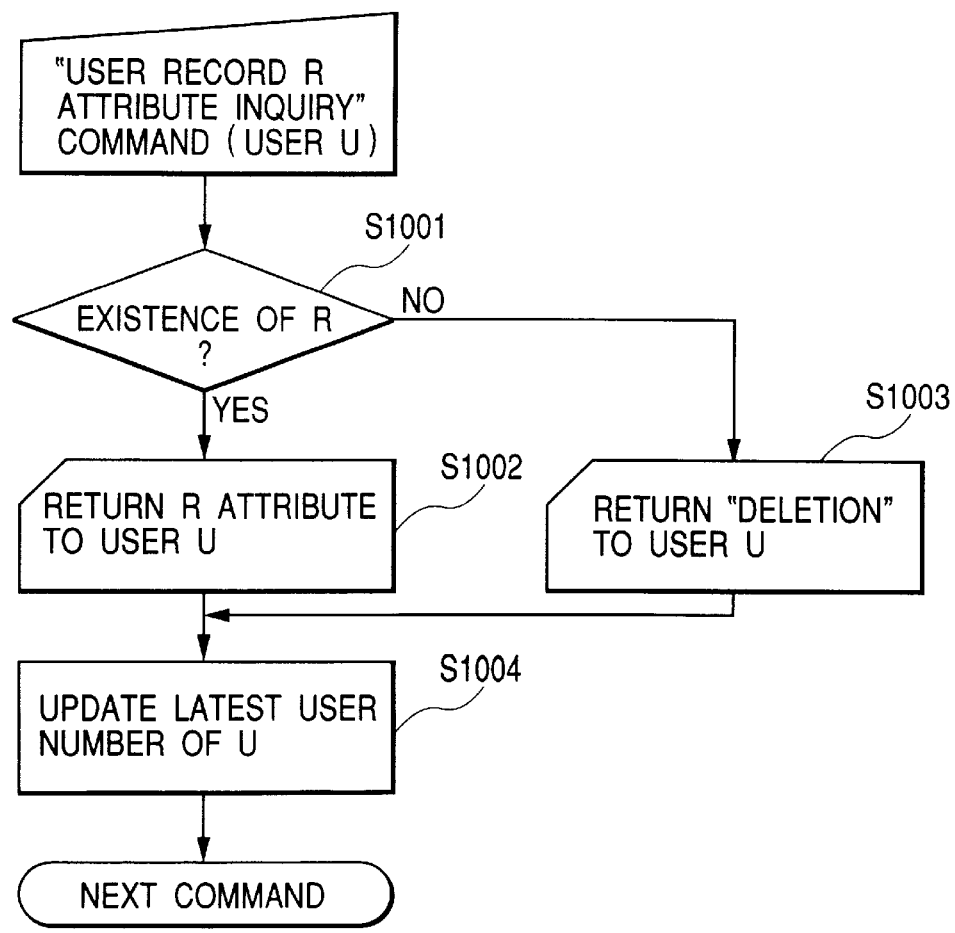
FIG. 10 is a flow chart showing the processing by the server device 102 when a user record attribute inquiry command is received.

FIG. 10 is the flow chart showing the processing by the server device 102 at the time when the user record attribute inquiry command is received. When the attribute inquiry command of a user record R is received from the user U, it is confirmed in a step S1001 whether or not the user record R exists in the data memory device 101. If exists, the user record R is returned in a step S1002. On the other hand, if not exist, the data representing "deletion" is returned in a step S1003. When the processing in the step S1002 or S1003 terminates, the latest user number of the user record R is checked in a step S1004. If the checked number is smaller than R, it is replaced by R.

Figure 11:
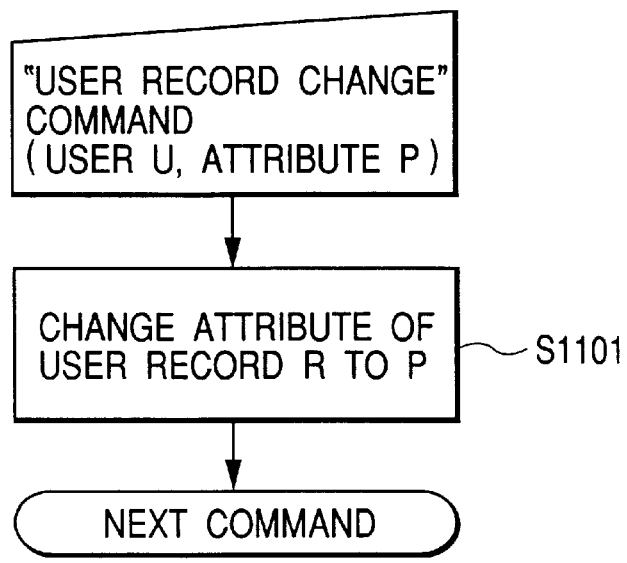
FIG. 11 is a flow chart showing processing by the server device 102 when a user record change command is received.

FIG. 11 is the flow chart showing the processing by the server device 102 at the time when the user record change command is received. When the user record change command is received from the user U, the attribute filed of the user record in the command is set to be P. Then, in a step S1101, the attribute field of the user record R in the data memory device 101 is replaced by P.

Figure 12:
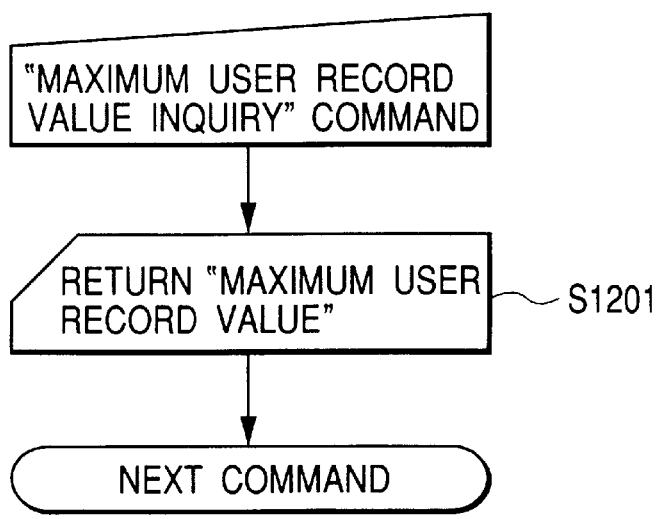
FIG. 12 is a flow chart showing the processing by the server device 102 when a maximum user record value inquiry command is received.

FIG. 12 is the flow chart showing the processing by the server device 102 at the time when the maximum user record value inquiry command is received. In a step S1201, the maximum user record value 209 in the data memory device 101 is returned.

Figure 13:
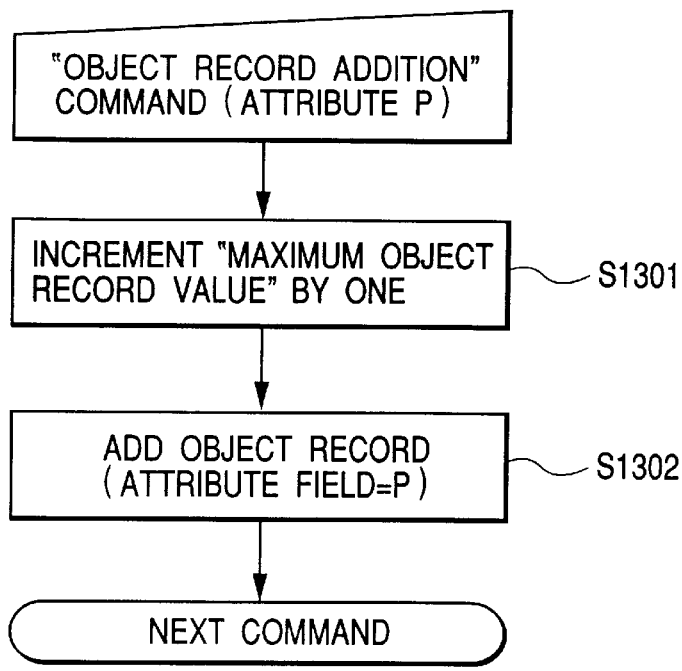
FIG. 13 is a flow chart showing the processing by the server device 102 when an object record addition command is received.

FIG. 13 is the flow chart showing the processing by the server device 102 at the time when the object record addition command is received. In a step S1301, the maximum object record value 205 in the data memory device 101 is increased by one. Then, in a step S1302, a new object record is formed in the data memory device 101. At this time, the object number is set to be the maximum object record value 205, and the attribute is set to be that of the object record included in the command.

Figure 14:
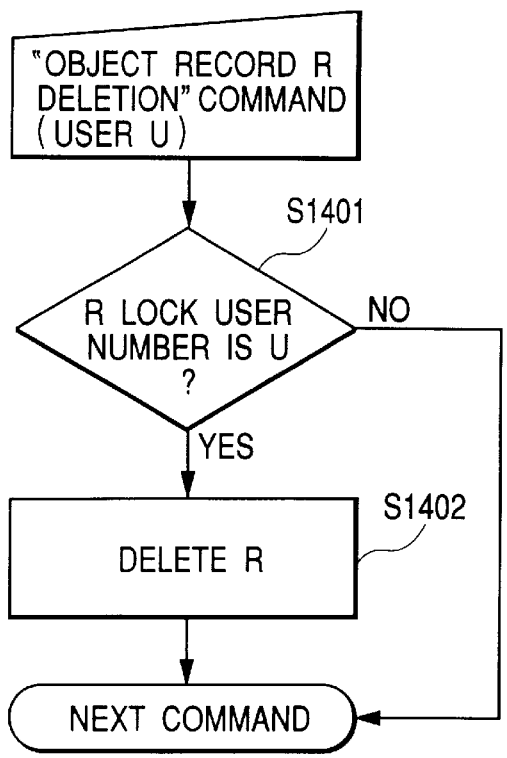
FIG. 14 is a flow chart showing the processing by the server device 102 when an object record deletion command is received.

FIG. 14 is the flow chart showing the processing by the server device 102 at the time when the object record deletion command is received. When the deletion command of the object record R is received from the user U, it is checked in a step S1401 whether or not the object record R in the data memory device 101 is being locked by the user U. If not locked, no processing is performed. On the other hand, if locked, R is deleted in a step S1402.

Figure 15:
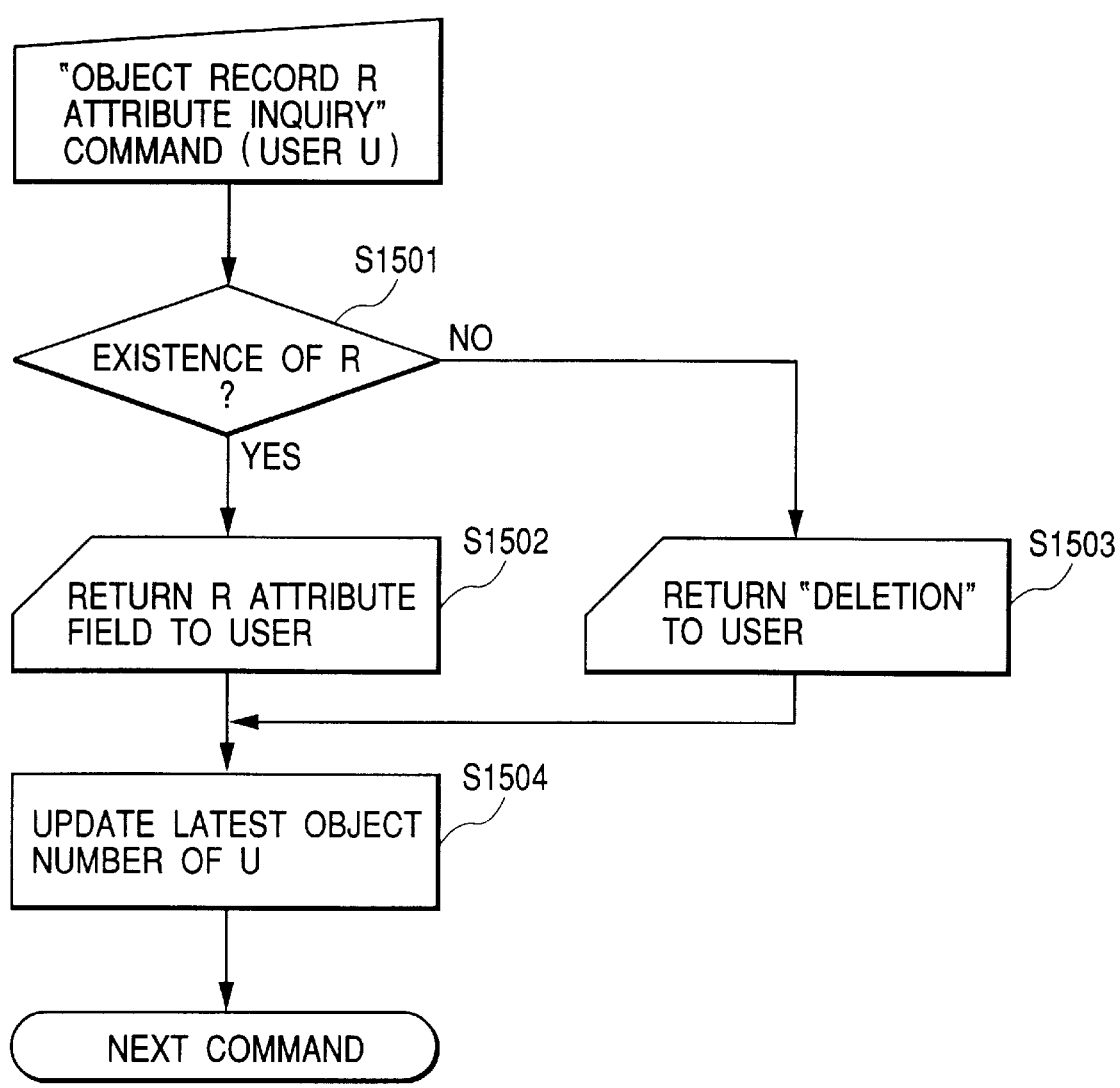
FIG. 15 is a flow chart showing the processing by the server device 102 when an object record attribute inquiry command is received.

FIG. 15 is the flow chart showing the processing by the server device 102 at the time when the object record attribute inquiry command is received. When the attribute inquiry command of the object record R is received from the user U, it is confirmed in a step S1501 whether or not R exists in the data memory device 101. If R exists, R is returned in a step S1502. On the other hand, if not exit, the data representing "deletion" is returned in a step S1503. When the processing in the step S1502 or S1503 terminates, the latest object number of the user record U is checked in a step S1504. If the object number is smaller than R, it is replaced by R.

Figure 16:
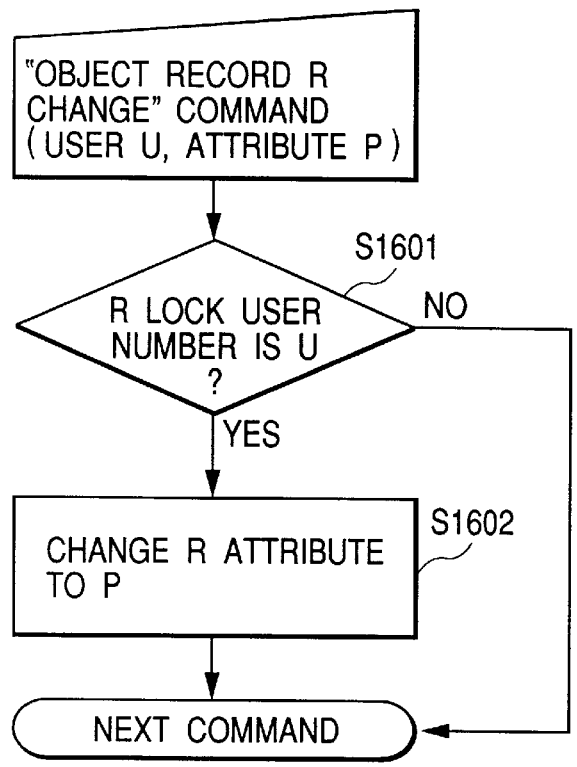
FIG. 16 is a flow chart showing the processing by the server device 102 when an object record change command is received.

FIG. 16 is the flow chart showing the processing by the server device 102 at the time when the object record change command is received. When the object record change command is received from the user U, it is checked in a step S1601 whether or not the object record R of the data memory device 101 is being locked by the user U. If not locked, no processing is performed. On the other hand, if locked, the attribute field of the object record in the command is set to be P. Then, in a step S1602, the attribute field of the user record R in the data memory device 101 is replaced by P.

Figure 17:
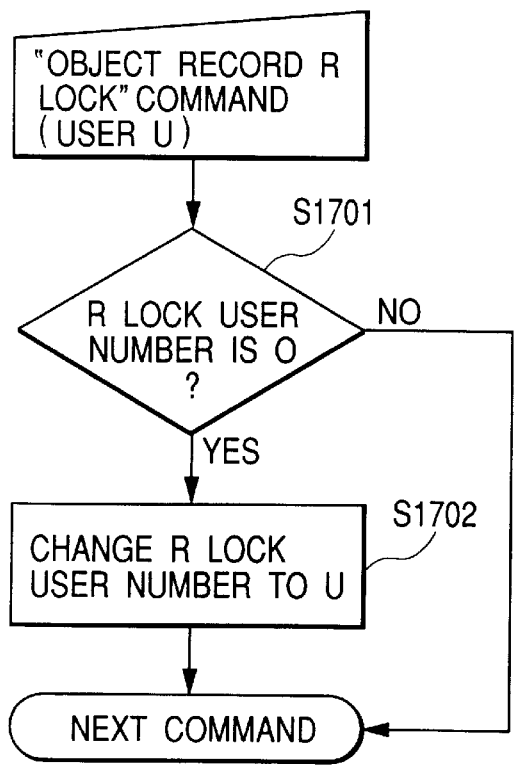
FIG. 17 is a flow chart showing the processing by the server device 102 when an object record lock command is received.

FIG. 17 is the flow chart showing the processing by the server device 102 at the time when the object record lock command is received. When the lock command of the object record R is received from the user U, it is checked in a step S1701 whether or not the object record R of the data memory device 101 is "0". If not "0", no processing is performed. On the other hand, if "0", the lock user number of the object record R is rewritten into U in a step S1702.

Figure 18:
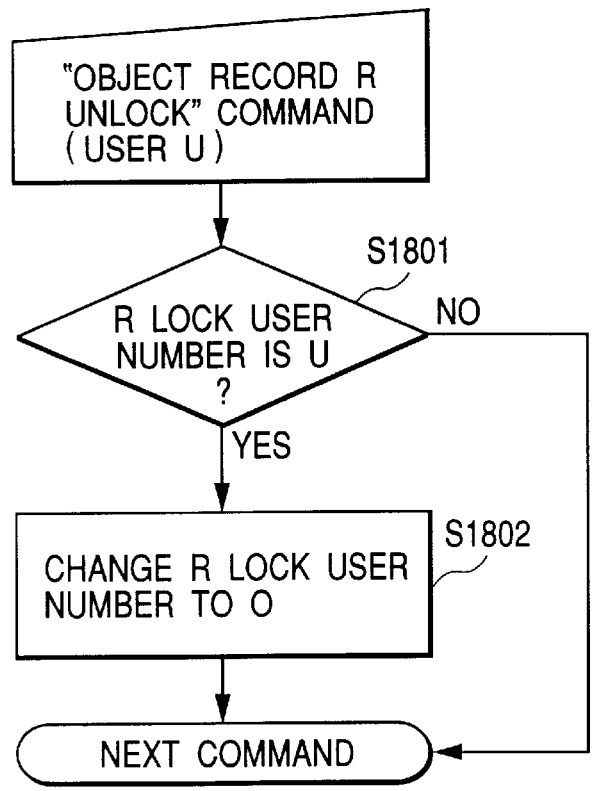
FIG. 18 is a flow chart showing the processing by the server device 102 when an object record unlock command is received.

FIG. 18 is the flow chart showing the processing by the server device 102 at the time when the object record unlock command is received. When the lock command of the object record R is received from the user U, it is checked in a step S1801 whether or not the object record R of the data memory device 101 is U. If not U, no processing is performed. On the other hand, if U, the lock user number is rewritten into "0" in a step S1802.

Figure 19:
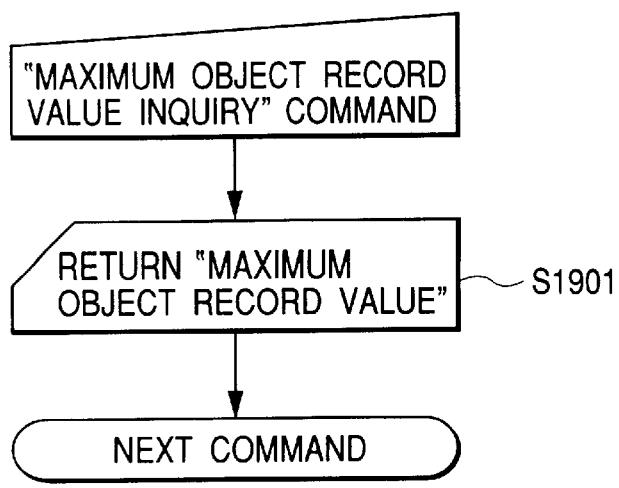
FIG. 19 is a flow chart showing the processing by the server device 102 when a maximum object record value inquiry command is received.

FIG. 19 is the flow chart showing the processing by the server device 102 at the time when the maximum object record value inquiry command is received. In a step S1901, the maximum object record value 205 of the data memory device 101 is returned.

The server device 102 repeats the processing on the above-described 12 kinds of the commands as far as the command is stored in the command buffer 305. If the data memory device 101 of the server device 102 is rewritten, identical rewriting information is sent from the server device 102 to the data memory devices 503 of all the terminal equipments.

Subsequently, the processing on the side of the terminal equipment 103 in the first embodiment will be explained hereinafter with reference to flow charts shown in FIGS. 20 to 24, 28 and 33. The programs for the processing have been stored in the processing program memory device 502 and are executed by the CPU 501.

Figure 20:
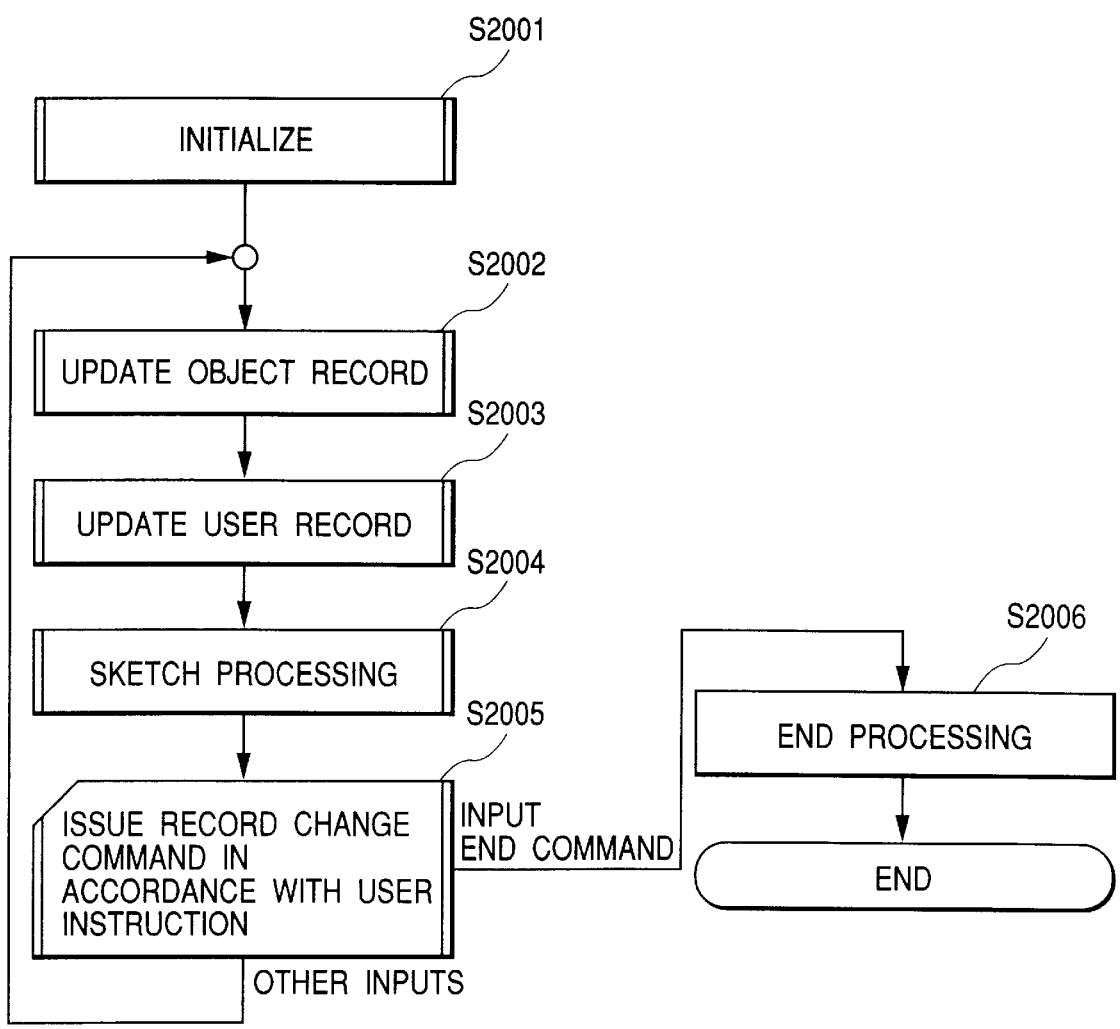
FIG. 20 is a flow chart showing the processing by the terminal equipment in the first embodiment.

FIG. 20 is the flow chart showing the processing by the terminal equipment 103 in the first embodiment.

Initially, the data memory device 503 is initialized in a step S2001, and the flow enters into a sketch loop. In the sketch loop, the object record of the data memory device 503 is updated in a step S2002. Then, in a step S2003, the user record of the data memory device 503 is updated. After terminating the updating, in a step S2004, sketch processing is performed on the frame buffer 504 by using the data in the data memory device 503. After terminating the sketch processing, in a step S2005, a user's instruction is received from the keyboard 506 or the mouse 507. In a case where the user instructs to terminate the processing, end processing is performed in a step S2006. In other cases, the command to change the content of the data memory device 101 is issued to the server device 102 according to the user's instruction, and the flow again enters into the sketch loop and returns to the step S2002.

Figure 21:
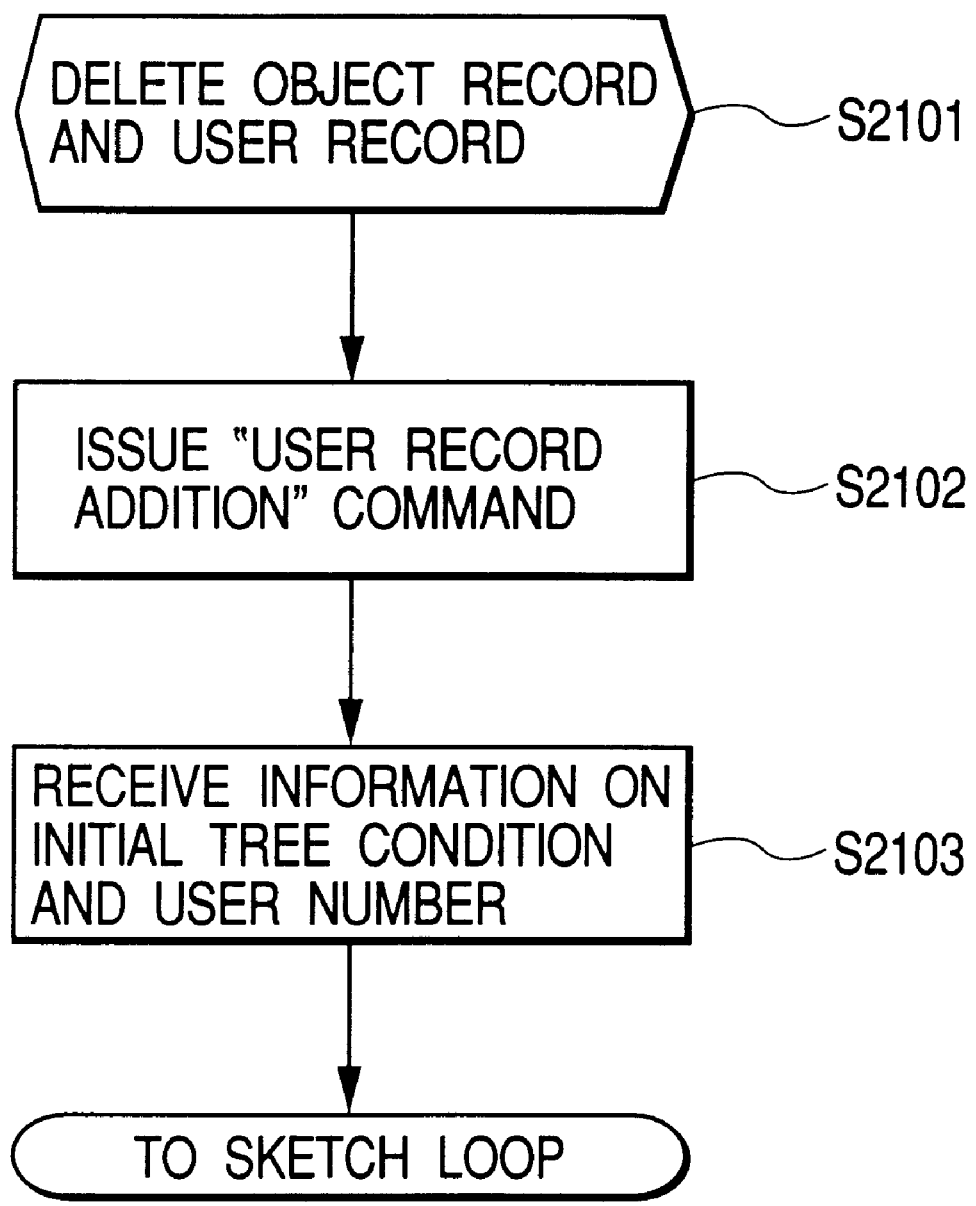
FIG. 21 is a flow chart showing initialization processing by the terminal equipment.

FIG. 21 is the flow chart showing the detailed processing in the initializing step S2001.

In a step S2101, all the object records and the user records are deleted. Then, in a step S2102, the user record addition command is issued to the server device 102. In the command, a return address is set as the terminal equipment 103. In a step S2103, when the information 201 representing the initial tree state and the user number are returned from the server device 102, the data memory device 503 records them respectively as the information 601 representing the initial tree state and the user number 602.

Figure 22:
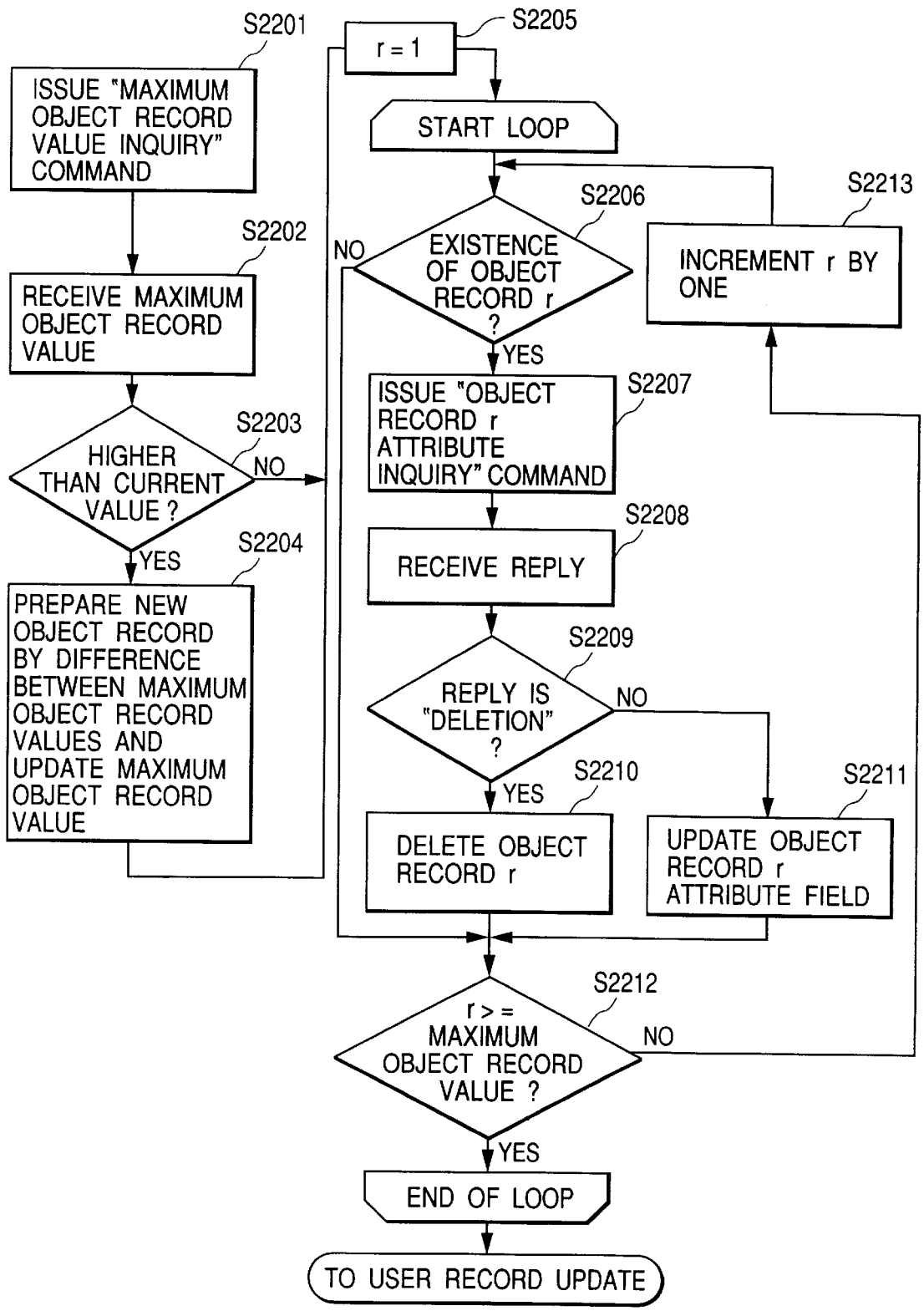
FIG. 22 is a flow chart showing object record update processing by the terminal equipment.

FIG. 22 is the flow chart showing the detailed processing in the step S2002 to update the object record of the data memory device 503.

Initially, in a step S2201, the maximum object record value inquiry command is issued. In the command, a return address is set as the address of the terminal equipment 103. Then, the maximum object record value 205 is received from the server device 102 in a step S2202, and the received value is compared with the maximum object record value 606 of the data memory device 503 in a step S2203. If the two values are equal to each other, the flow advances to a step S2205. On the other hand, if not equal, the flow advances to a step S2204.

In the step S2204, the new object records are formed by a difference between the maximum object record value 606 of the data memory device 503 and the maximum object record value 205 received from the server device 102, and the maximum object record value 606 of the data memory device 503 is updated into the maximum object record value 205 received from the server device 102. After then, the flow advances to the step S2205. At this time, the object numbers of the newly formed object records are rendered one by one at the value obtained by adding "1" to the maximum object record value 606 of the data memory device 503 to the maximum object record value 205 received from the server device 102.

In the step S2205, a loop variation r is set to be "1", and the flow enters into the object updating loop. Then, it is checked in a step S2206 whether or not the object record of which object number is r exists in the data memory device 503. If r does not exist, the flow advances to a step S2212. On the other hand, if r exists, the flow advances to a step S2207. In the step S2207, the attribute inquiry command of the object record r is issued to the server device 102. In a step S2208, the reply from the server device 102 is received. Then, it is judged in a step S2209 whether or not the received value is the data representing "deletion". If "deletion", the object record r of the data memory device 503 is deleted in a step S2210, and the flow advances to the step S2212. On the other hand, if not "deletion", the object record r of the data memory device 503 is updated in a step S2211, and the flow advances to the step S2212.

In the step S2212, the value of r is compared with the maximum object record value 606. If the value of r is equal to or larger than the maximum object record value 606, the flow escapes from the loop and then advances to the step S2003 to update the user record of the data memory device 503. On the other hand, if the value of r is less than the maximum object record value 606, "1" is added to the value of r, and the flow returns to the step S2206.

When the updating of the object record of the data memory device 503 in the step S2002 terminates as above, the updating of the user record of the data memory device 503 in the step S2003 is performed in the same manner.

Figure 23:
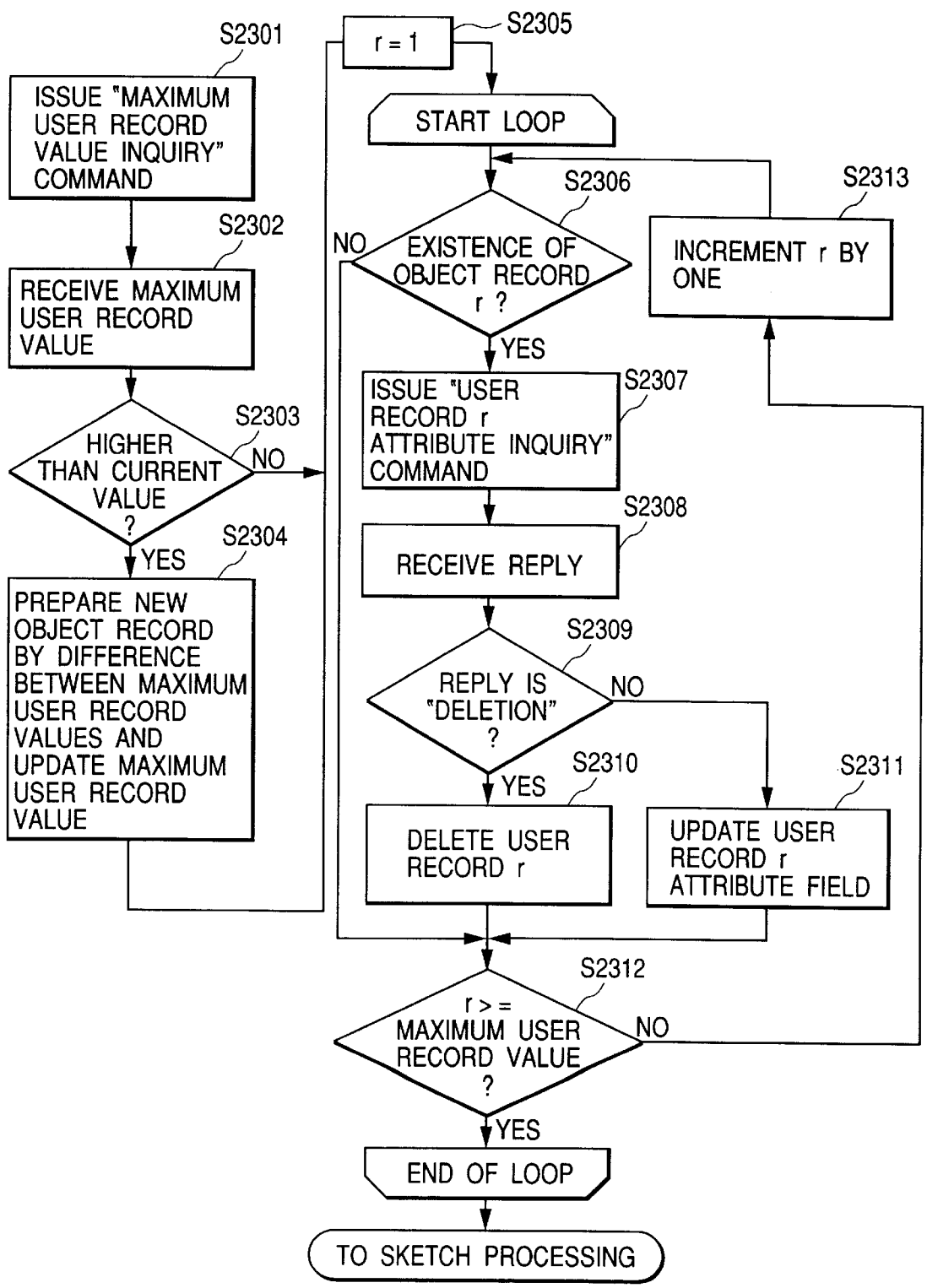
FIG. 23 is a flow chart showing user record update processing by the terminal equipment.

FIG. 23 is the flow chart showing the detailed processing in the step S2003 to update the user record of the data memory device 503.

In the flow chart of the step S2003, the processing is identical with that in the step S2002 explained in FIG. 22 except for a processing target. Namely, in the step S2003, the target is not the object record but is the user record. Therefore, detailed explanation thereof will be omitted.

Figure 24:
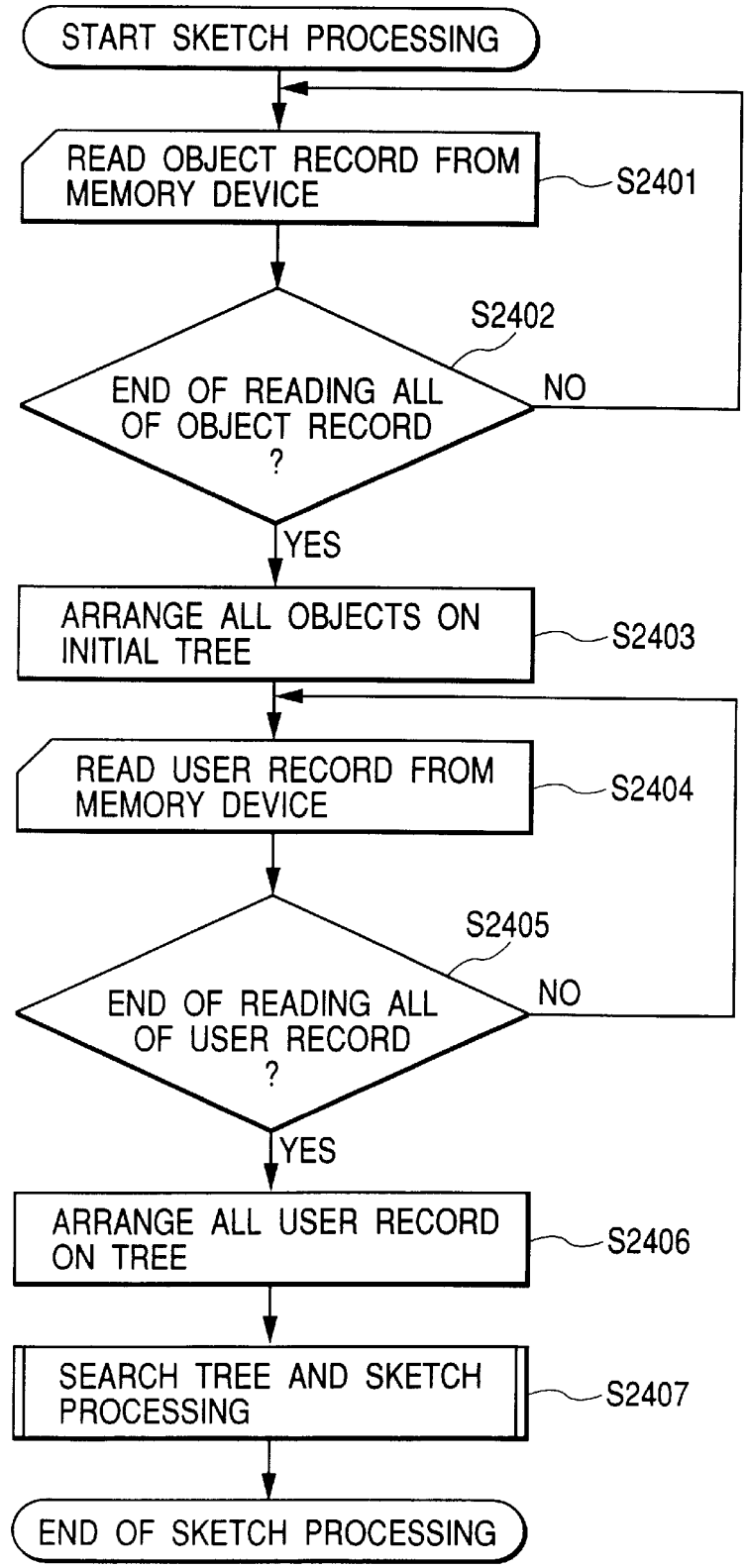
FIG. 24 is a flow chart showing sketch processing by the terminal equipment.

FIG. 24 is the flow chart showing the detailed processing in the step S2004 to perform the sketch based on the data stored in the data memory device 503.

Initially, in a step S2401, the object record is read from the data memory device 503. Then, it is judged in a step S2402 whether or not reading of all the object records terminated. If not terminated, the flow again returns to the step S2401 to read the next object record. On the other hand, if terminated, in a step S2403, the object is arranged on the initial tree according to the position data included in the attribute field of the object record.

Subsequently, the same processing as that in the steps S2401 to S2403 is performed on the user record. Then, in a step S2404, the user record is read from the data memory device 503, and it is judged in a step S2405 whether or not reading of all the object records terminates. If not terminated, the flow again returns to the step S2404 to read the next user record. On the other hand, if terminated, in a step S2406, the read user record is arranged on the tree formed in the step S2403, according to the attribute field of the user record. Thus, a humanoid model of the another user who shares the virtual environment is arranged in the virtual environment, whereby it can be confirmed at which position and which direction the another user observes. Finally, in a step S2407, the tree formed in the step S2406 is searched and the sketch processing is performed.

In the first embodiment, when the three-dimensional virtual environment is constructed, like the prior art method (1), the elements (coordinate conversion data, shape data, surface attribute data, illumination and the like) composing the virtual environment is expressed by means of a tree structure. This is because the space, the ground, buildings, rooms, furniture, illuminators, ornaments and the like composing the three-dimensional space are considered to be essentially in a hierarchical nested relation. For example, since the ornament on the desk is moved according to arrangement of the desk, the ornament is in the relation depending on the arrangement of the desk. Therefore, it is often more convenient for the ornament to be relatively arranged based on the coordinate system in which the desk exists, thereby applying the data structure in which the arrangements of the elements are in the hierarchically dependent relation. As the method to do so, the virtual environment is expressed by a n-tree structure.

Figure 25:
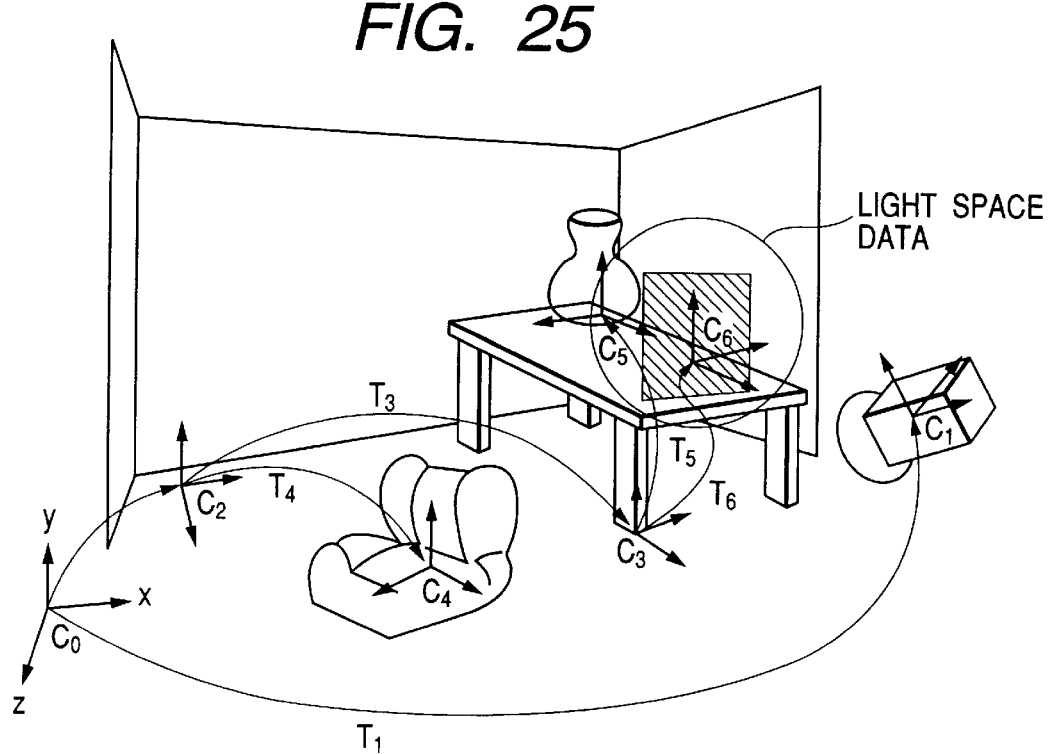
FIG. 25 is a view showing an example of virtual environment generated in the first embodiment.

FIG. 25 shows an example of one simple virtual environment. In this case, if it pays attention to a room, a desk and a sofa in the space, the room is described on a coordinate system $C_2$ converted from a world coordinate system $C_0$ through a coordinate conversion $T_2$, and the desk and the sofa in this room are described respectively on coordinate systems $C_3$ and $C_4$ respectively converted from the coordinate system $C_2$ through coordinate conversions $T_3$ and $T_4$. Further, a pot on the desk is described on a coordinate system $C_5$ converted from the coordinate system $C_3$ through a coordinate conversion $T_5$. Unlike the prior art method (1), in the first embodiment, the object included in the tree structure can be described by using not only the geometrical data but also the light space data. In FIG. 25, the light space data is arranged on the desk, and this data is described on a coordinate system $C_6$ converted from the coordinate system $C_3$ through a coordinate conversion $T_6$.

In the prior art method (4) wherein the virtual environment is shared by the plural users, it is impossible to share by the plural users the virtual environment which is described by mixing the data such as the light space data different in characteristic from the shape data. However, in the first embodiment, the light space data as well as the shape data is described as one element of the identical tree structure, and this tree structure is maintained to be identical among the plural users. Thus, the virtual environment in which the object having the complicated shape is expressed as the light space data and the data representing the room or the row of houses is expressed as the shape data can be shared by the plural users.

Figure 26:
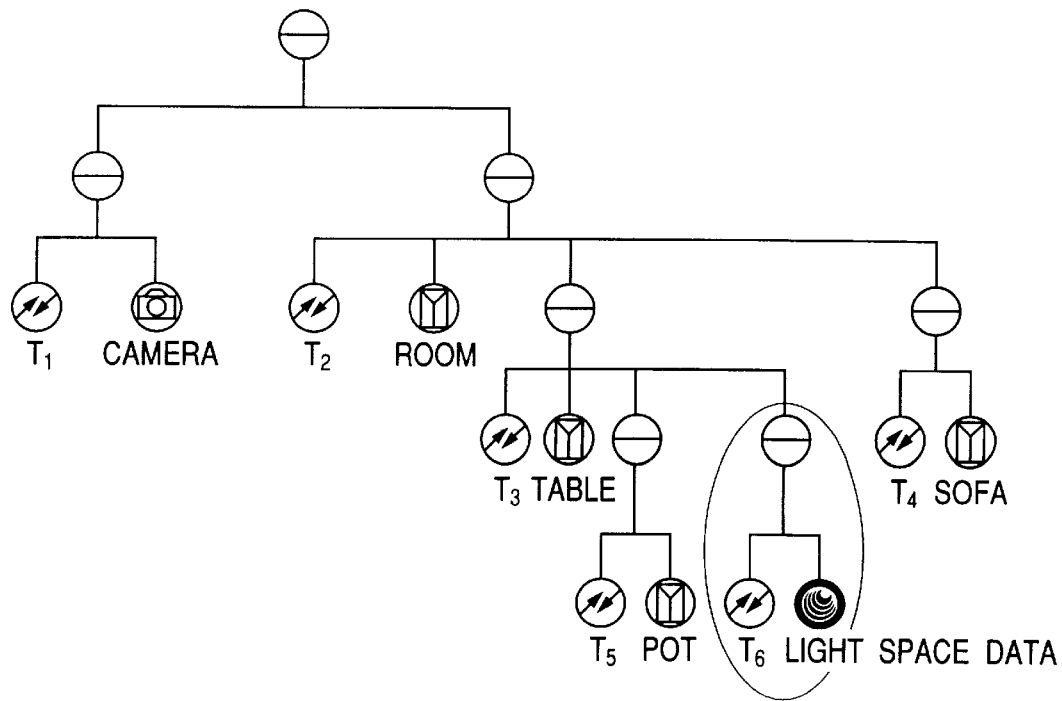
FIG. 26 is a view showing the virtual environment in FIG. 25 by using tree structure.

FIG. 26 shows the tree structure schematically expressing the virtual environment shown in FIG. 25. Further, FIG. 27 shows the data structure when the tree-structure data is expressed by text data for recording. In FIG. 27, a keyword "Separator" expresses a top of the partial tree, and a keyword "Transform" expresses a coordinate conversion. It should be noted that other keywords may be used instead of "Separator", "Transform" and the like if they are appropriately distinguished. Further, it should be noted that breakoff symbols such as "{" and "}" may be replaced by other symbols or character strings.

In the virtual environment wherein the light space data is described as one element composing the tree structure, in the case where the light space data is shared by the plural users, by communicating the object record which has the light space data and the position data as the attribute field and has as the position data the data obtained through the coordinate conversion $T_6$ from the position in the tree structure on which the light space data is arranged, the light space data in the virtual environment can be shared by the plural users.

Figure 28:
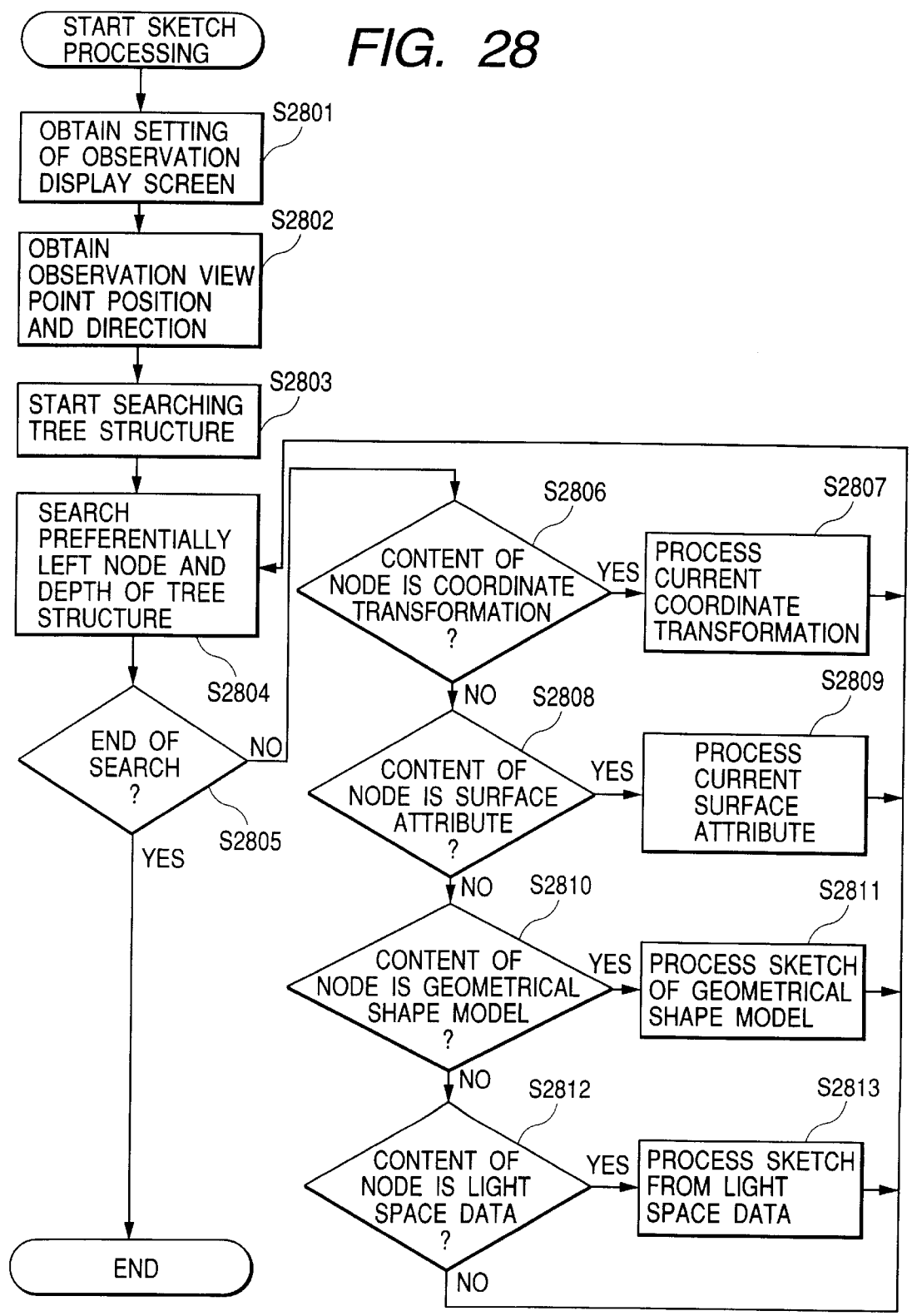
FIG. 28 is a flow chart showing processing to present the tree structure to an observer (user)

FIG. 28 is the flow chart showing the detailed processing in the step S2407 to search the tree in such the virtual environment as expressed by the above tree structure and perform the sketch processing.

In order to cause the observer to observe the virtual environment, it is necessary to sketch on the display screen how the virtual environment is seen or viewed at the observer's viewpoint. In the data tree of n trees shown in FIG. 26, all nodes are traced by preferentially searching the left node and the depth of the tree structure to access the data of all the nodes composing this tree. At this time, the sketch is sequentially performed on the display screen at the time when accessing the node, on the basis of the information written within the accessed node. This is the basic method to perform the sketch processing.

Initially, in a step S2801, setting of the observation display screen is obtained. Then, the position and direction of the observation viewpoint are obtained from the user record in a step S2802, and the searching of the tree structure starts in a step S2803. As described above, the search processing is performed in the manner of preferentially searching the left node and the depth of the tree structure (step S2804). The node is searched until this searching in the step S2804 terminates (step S2805).

If the content of the searched node is the coordinate conversion (step S2806), the flow advances to current coordinate conversion processing in a step S2807. In this processing, if there has been no node which is the coordinate conversion, the presently existent coordinate conversion is set to be the current coordinate conversion which acts as the basic coordinate conversion of the partial tree deeper than the depth of the node being searched in the tree. On the other hand, if the node which is the coordinate conversion newly appears, the already existent coordinate conversion is multiplied by the newly appeared coordinate conversion to update the current coordinate conversion. Thus, the updated coordinate conversion is set to be the current coordinate conversion of the partial tree deeper than the depth of the node in the tree. When the searching is performed in the deeper direction of the tree, by handing the present current coordinate conversion, the current coordinate conversion is provided to the next depth. If there is no branch in the deeper direction and thus the searching is performed in the shallower direction by one step, the current coordinate conversion supposed to be updated at the deeper state in the tree is not provided to the shallower direction. Instead, the current coordinate conversion which must have been existent when the tree at that depth was searched before is used.

If the searched node is not the coordinate conversion in the step S2806, the flow advances to a step S2808. In this step, if the content of the node represents the surface attribute, the flow advances to a step S2809 to perform the current surface attribute processing. In this processing, the surface attribute is set to be the current surface attribute which acts as the basic surface attribute of the partial tree deeper than the depth of the node in the tree at the time when the node appears. When the searching is performed in the deeper direction of the tree, by handing the present current surface attribute, the current surface attribute is provided to the next depth. If there is no branch in the deeper direction and thus the searching is performed in the shallower direction by one step, the current surface attribute supposed to be updated at the deeper state in the tree is not provided to the shallower direction. Instead, the current surface attribute which must have been existent when the tree at that depth was searched before is used.

If the searched node does not represent the surface attribute in the step S2808, the flow advances to a step S2810. If the content of the searched node represents a geometrical shape model in the step S2810, the flow advances to a step S2811 to perform the geometrical shape model sketch processing. In this processing, the coordinate conversion on position, direction, scale and the like of that shape model is performed by using the current coordinate conversion, and the sketching is performed on the display screen provided to the observer as a two-dimensional image by using the current surface attribute in the above-described conventional methods (1). At that time, a depth value storing map corresponding to each pixel of the provided display screen has been previously prepared. When the shape model is sketched in the sketch processing, the depth value of the three-dimensional position on the surface of the shape model at the position corresponding to each pixel of the display screen viewed from the viewpoint position is written at the same pixel in the depth value storing map. At that time, if the depth-value writing to the depth value storing map has been performed through such the processing, and if the depth value obtained to newly perform the sketching is larger than the already stored depth value, the pixel writing to the provided sketch and the rewriting of the depth value storing map are not performed.

If the searched node does not represent the geometrical shape model in the step S2810, the flow advances to a step S2812. If the content of the searched node represents the light space data in the step S2812, the flow advances to a step S2813 wherein the sketch processing is performed from the light space data. In this processing, the coordinate conversion on position, direction, scale and the like of the light space data is initially performed by using the current coordinate conversion. Then, it is calculated at which position and in which direction the observation viewpoint position is located in the sight of the standard plane of the light space data. Based on the calculated results or the like, a sketching rule in forming the image which is to be formed from the light space data in such observation conditions is determined, and the image to be displayed on the provided display screen is actually formed. At that time, like the sketching from the geometrical shape model, the depth is judged in the unit of a pixel on the display screen. That is, the distance between the viewpoint position and the position at which the standard plane of the light space data is located is considered as the depth value of the light space data, and the obtained value is compared with the depth value stored in the depth value storing map. On the pixel of which depth value is smaller than the value of the depth value storing map, the image formed from the light space is overwritten to update the depth value storing map. On the other hand, if not smaller, no processing is performed.

If the searched node does not represent the light space data in the step S2812, or if the processing in the steps S2807, S2809, S2811 and S2813 terminates, the flow again returns to the step S2804 to perform the search processing on the tree. Then, if it is judged in the step S2805 that the searching on the tree terminated, the sketch processing terminates.

When the sketching based on the updated object record and the updated user record terminates, the flow advances to the step S2005 to perform the processing according to the user's instruction. In this processing, the user can instruct the seven kinds of processing, i.e., to add the object, to delete the object, to lock the object, to unlock the object, to change the attribute of the object, to change the attribute of the user, and to terminate or end the processing.

Figure 33:
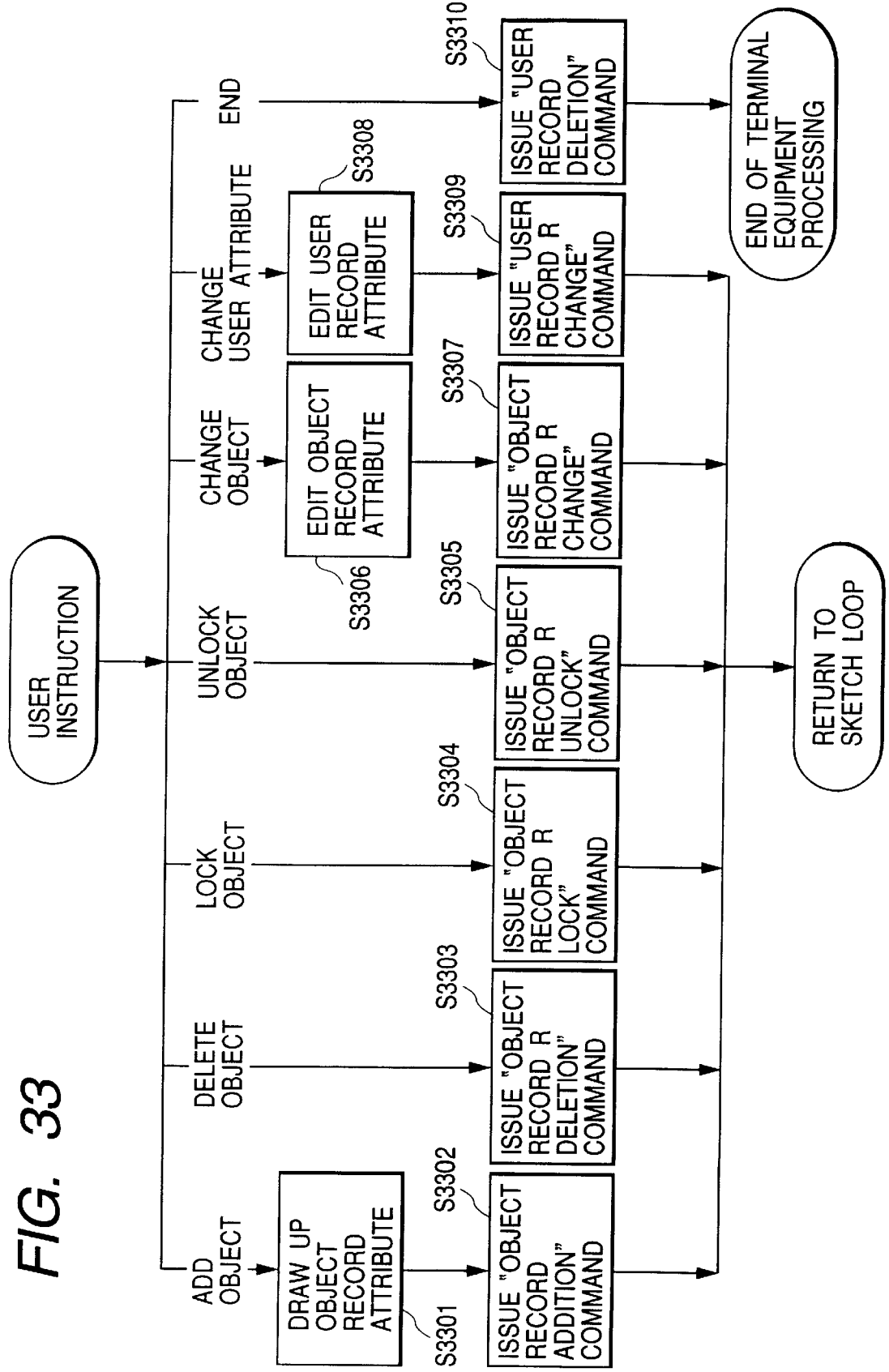
FIG. 33 is a flow chart showing user operation processing at the terminal equipment.

FIG. 33 is the flow chart showing the detailed processing in the step S2005 to issue the desired command according to the user's instruction.

If the user instructs to add the object, in a step S3301, the attribute of the object previously prepared by the user is added to the object record in the command. The attribute of the object includes the geometrical shape data having the surface attribute data, or the light space data. Then, in a step S3302, the object record addition command is issued to the server device 102. When the command issuing terminates, the flow returns to the step S2002 to again start the sketch loop.

When the user instructs to delete the object R, in a step S3303, the object record R deletion command is issued to the server device 102 by the terminal equipment, and the flow returns to the step S2002.

Similarly, the object record R lock command is issued in a step S3304 when the user instructs to lock the object R, or the object record R unlock command is issued in a step S3305 when the user instructs to unlock the object R. Then, the flow returns to the step S2002.

When the user instructs to change the attribute of the object, the changing corresponding to the operation by the user is performed on the object record (step S3306), and the object record change command including the changed object record is issued (step S3307).

When the user performs the operation such as movement of the viewpoint which causes some change in the user attribute, the change corresponding to such the operation is added to the user record in a step S3308, and then the user record change command is issued in a step S3309.

When the user instructs to terminate the processing, the user record deletion command corresponding to the user is issued to the server device 102 by the terminal equipment, and the processing terminates.

It is possible that, according to the data contents, these commands which change the data in the data memory device 101 connected to the server device 102 can not be accepted by the server device 102. For example, even if the user instructs to delete the object record not locked, the server device 102 does not delete the object record. However, it is unnecessary for the terminal equipment to confirm whether or not the command issued by the equipment itself has been accepted by the server device 102. That is, the terminal equipment can start the next processing immediately after issuing the command. Further, these commands are sent to all the other terminal equipments through the server device 102, and thus the data in the data memory device 503 within each equipment is changed.

Figure 29:
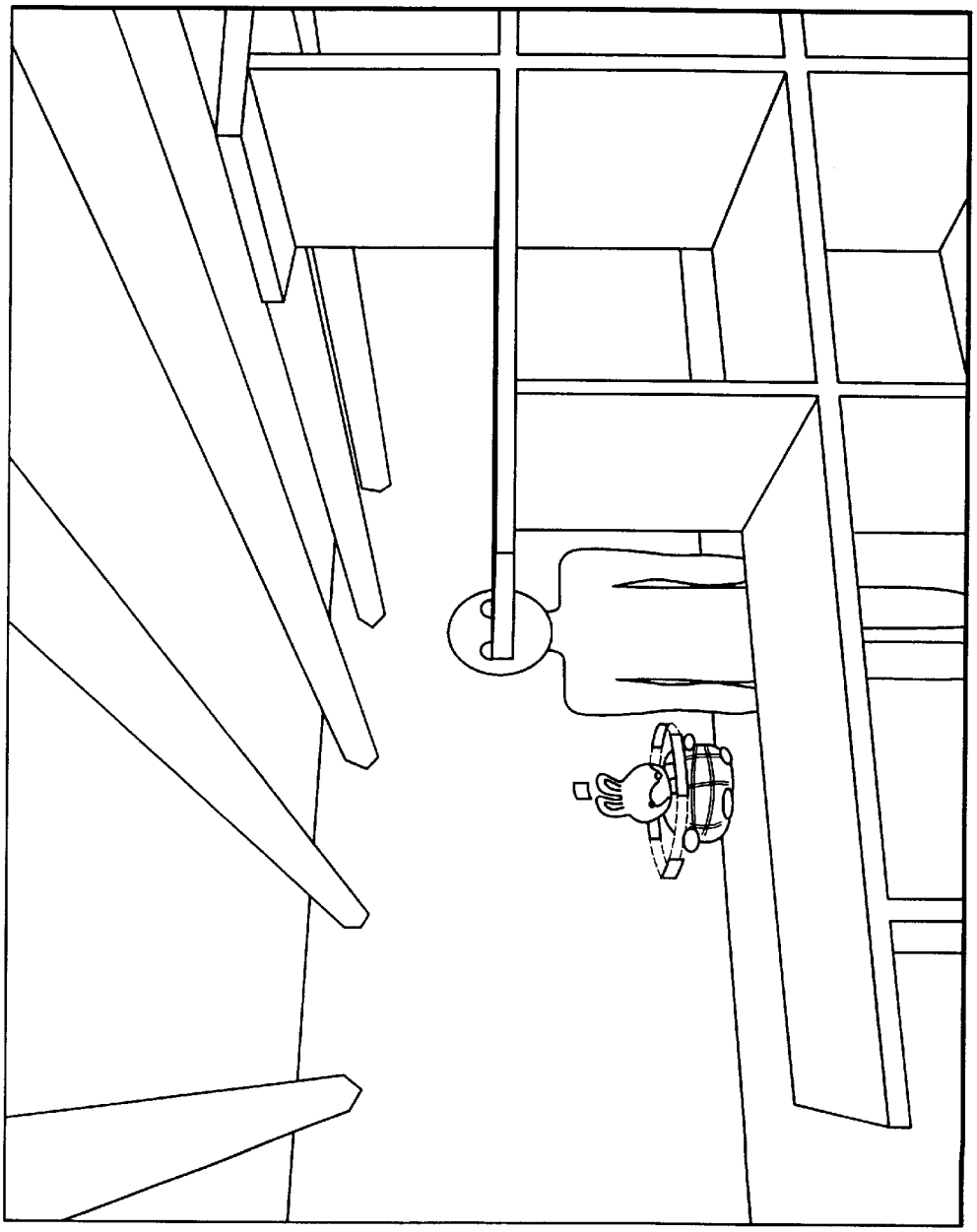
FIG. 29 is a view showing a sketch example of the virtual environment which is being observed by an observer 1 in the first embodiment.
Figure 30:
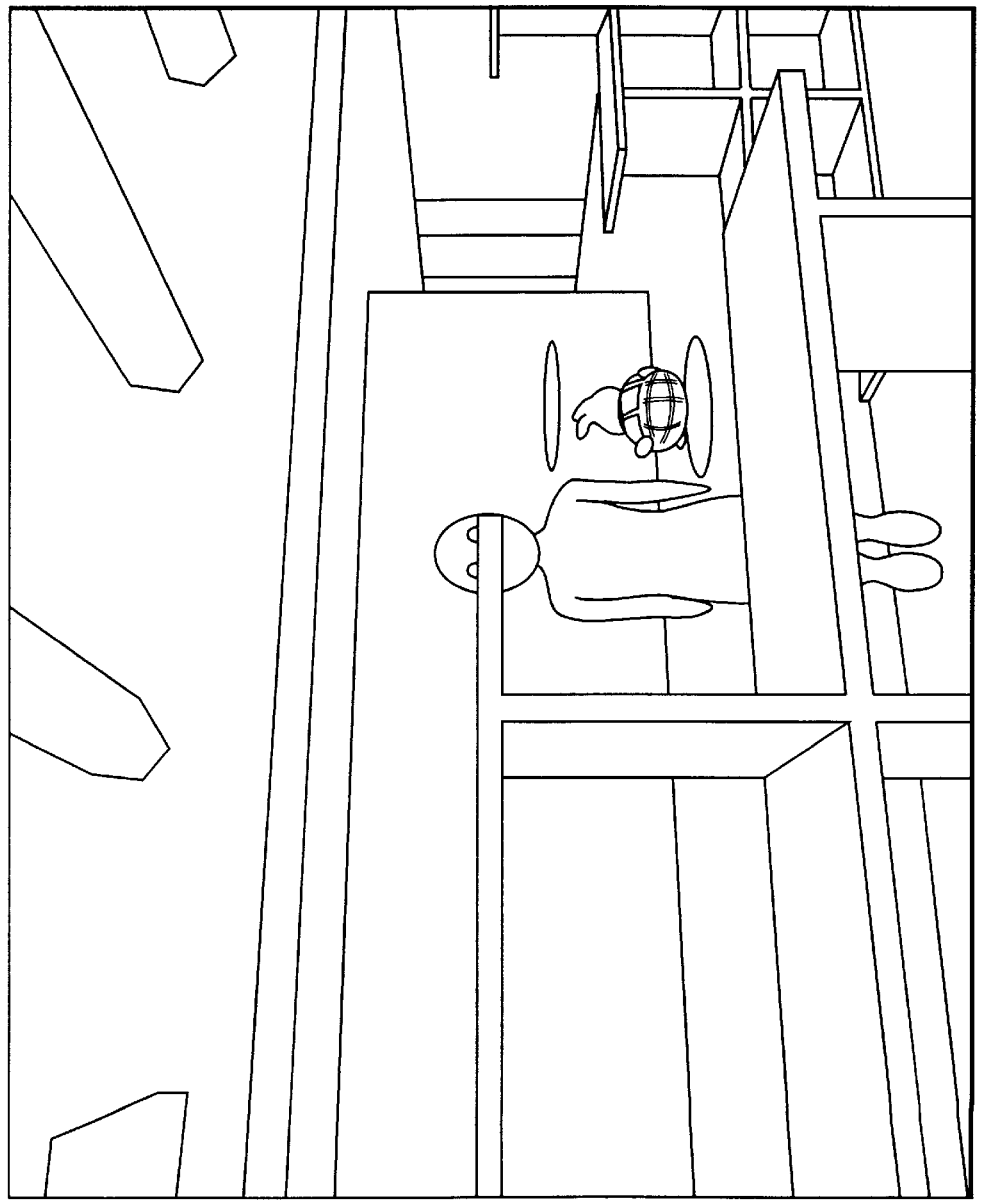
FIG. 30 is a view showing a sketch example of the virtual environment which is being observed by an observer 2 in the first embodiment.

FIGS. 29 and 30 respectively show examples of sketched images on the display screens when one virtual environment is shared by users 1 and 2. In FIG. 29, the virtual environment corresponding to the viewpoint position and direction of the user 1 is displayed on the display screen of the terminal equipment of the user 1. In FIG. 30, the virtual environment corresponding to the viewpoint position and direction of the user 2 is displayed on the display screen of the terminal equipment of the user 2.

In FIGS. 29 and 30, the respective users observe the identical virtual environment at the different positions and directions. In the drawings, it should be noted that a stuffed rabbit is described by the light space data, and the room and a humanoid model representing the user are described by the shape models. In FIG. 29 showing the virtual environment viewed by the user 1, the humanoid model of the user 2 is displayed at the center of the display screen to represent that the user 2 stands in front of the user 1. Further, geometrical objects acting as marks or signs are displayed on the periphery of the stuffed rabbit to represent that the user 1 is locking the rabbit. At that time, in FIG. 30 showing the virtual environment viewed by the user 2, the humanoid model of the user 1 is displayed at the center of the display screen to represent that the user 1 stands in front of the user 2. Further, geometrical objects having an inherent color of the user 1 are displayed above and below the stuffed rabbit to represent that the user 1 is locking the rabbit.

Figure 31:
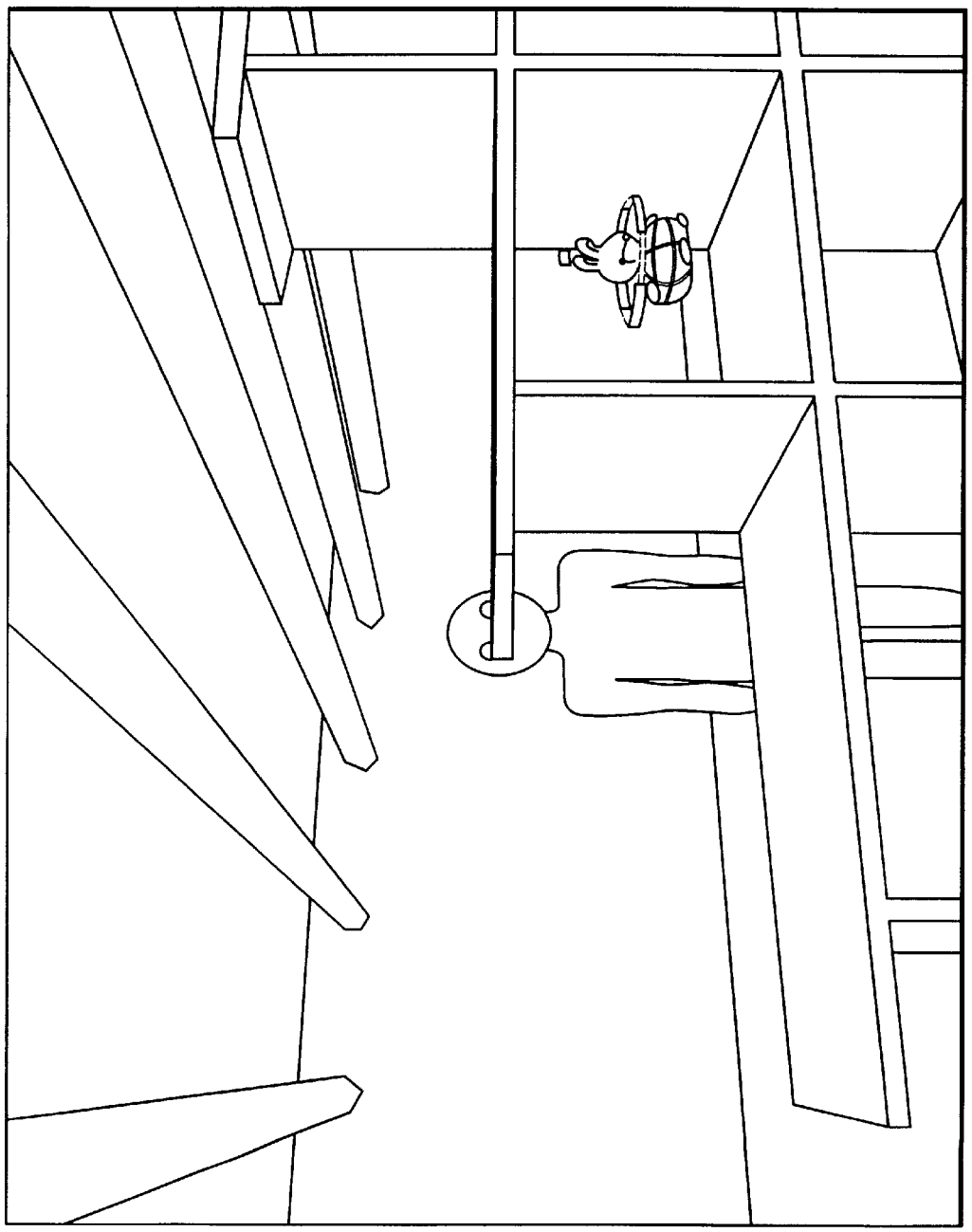
FIG. 31 is a view showing a sketch example of the virtual environment which is being observed by the observer 1 in the first embodiment.
Figure 32:
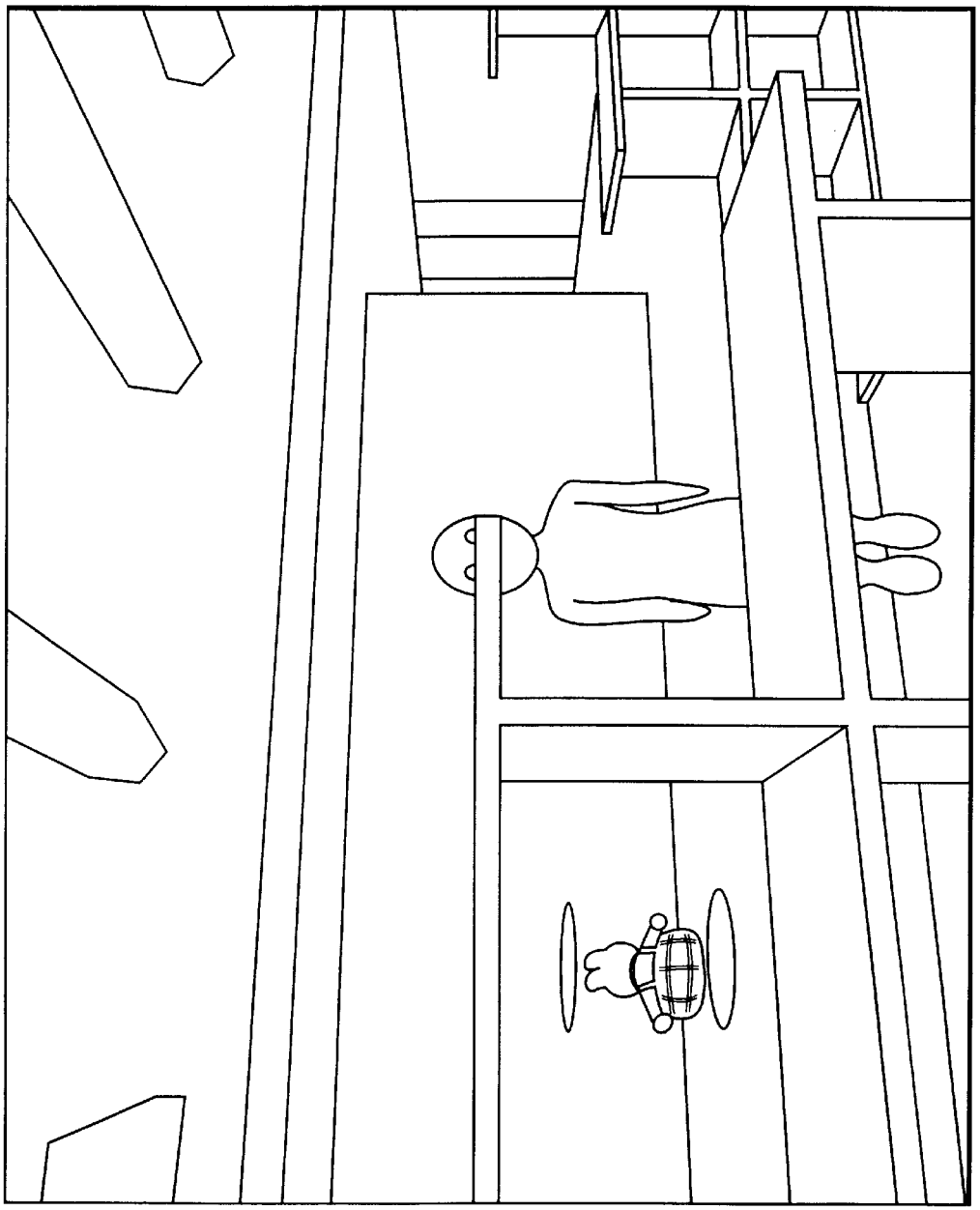
FIG. 32 is a view showing a sketch example of the virtual environment which is being observed by the observer 2 in the first embodiment.

Then, if the user 1 instructs the rabbit object locked in the virtual environment to change its position, the command is sent from the terminal equipment of the user 1 to the server device 102 and further sent to the terminal equipment of the user 2. Therefore, the example of the sketched image on the display screen shown in FIG. 29 is changed into that shown in FIG. 31. Further, according to movement of the rabbit object by the user 1, the example of the sketched image on the display screen shown in FIG. 30 is changed into that shown in FIG. 32.

(Second Embodiment)

In the first embodiment, the image to be displayed is formed from the light space data. However, in the present embodiment, an image necessary for display is formed from a multi-viewpoint image instead of the light space data by using the following method.

Figure 38:
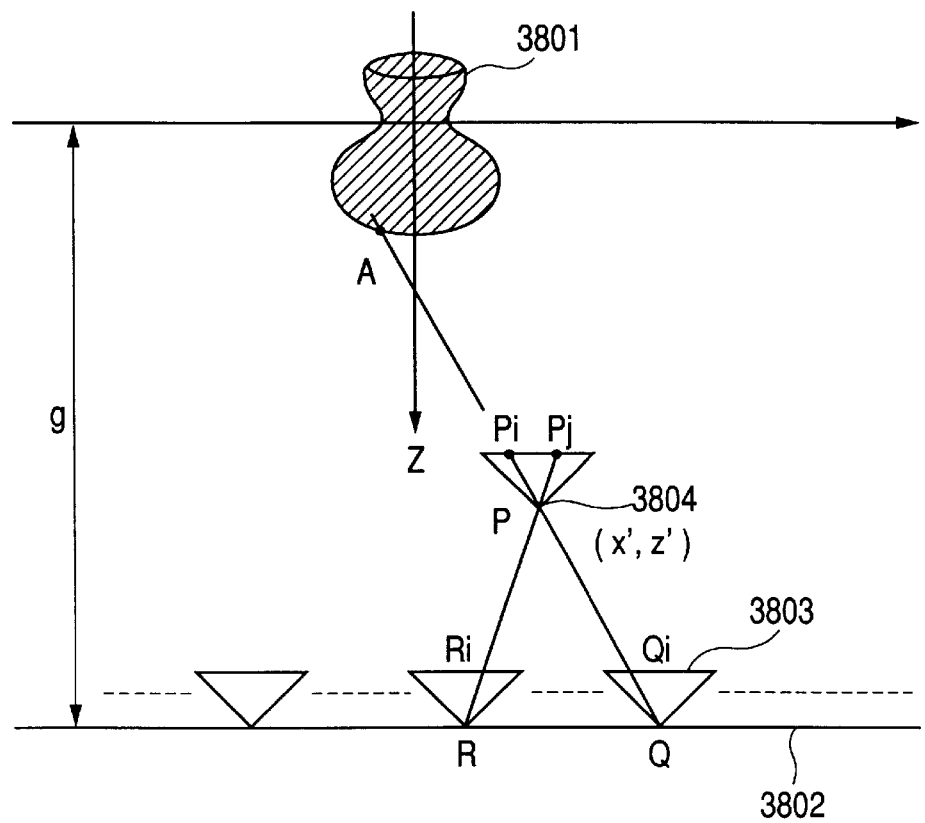
FIG. 38 is a view showing a principle that an image is formed from a multi-viewpoint image used in a second embodiment.

FIG. 38 is a view showing a principle that the image is restructured from the multi-viewpoint image inputted. As shown in the drawing, it is necessary as a photographing condition of the multi-viewpoint image to previously arrange cameras on a straight line perpendicular to a photographing direction and photograph the image by these cameras. Reference numeral 3801 denotes an object to be photographed, reference numeral 3802 denotes photographing viewpoints arranging line obtained by linking photographing points of the input image, reference numeral 3803 denotes a virtual CCD plane of a virtual camera, and reference numeral 3804 denotes a virtual camera put at an observer's position (x', z').

The processing to form the image from the multi-viewpoint image will be explained with reference to a flow chart shown in FIG. 39. Initially, in a step S3901, a target line j is set to a head line of an image P, and a target pixel is set to a left-end pixel of the line j. Then, in a step S3902, a position of an image Q on the photographing viewpoints arranging line 3802 corresponding to an i-th pixel of the line j of the image P is calculated as follows.

That is, it is assumed that one point A in the object is projected at a pixel position Pi of the virtual camera at the viewpoint position P, and that a position at which a line linking the positions A and P crosses the photographing viewpoints arranging line 3802 is Q. At this time, it can be understood from FIG. 38 that the photographed object at the pixel position Pi is equivalent to that at a pixel position Qi in the image photographed at the viewpoint position Q. According to a geometrically restricted condition in FIG. 38, the viewpoint position A in the X coordinate can be expressed by the equation (1). It is assumed that a central pixel position on a scanning line is at the 0-th pixel, a pixel pitch and a focusing distance of the virtual camera 3804 are respectively d and f, and a distance between an origin and the photographing viewpoints arranging line 3802 is g.

$$x = x' + i \cdot d \cdot (g - z')/f \quad (3)$$

Similarly, the photographed object at a pixel position Pj of the virtual camera at the viewpoint position P is equivalent to that at a pixel position Rj of the image at a viewpoint position R stored in the memory device. According to the method, for example, when the image is reconstructed by copying the i-th pixel value on the line j of the image Q to the i-th pixel on the line j of the image P, the obtained image is distorted. Namely, it is possible that the object in the image expands or shrinks longitudinally. Therefore, in order to eliminate such inconvenience, a line number n of the image Q corresponding to the line j of the image P is obtained in a step S3903. A method to obtain the line number n of the image Q will be explained with reference to FIG. 40.

Figure 40:
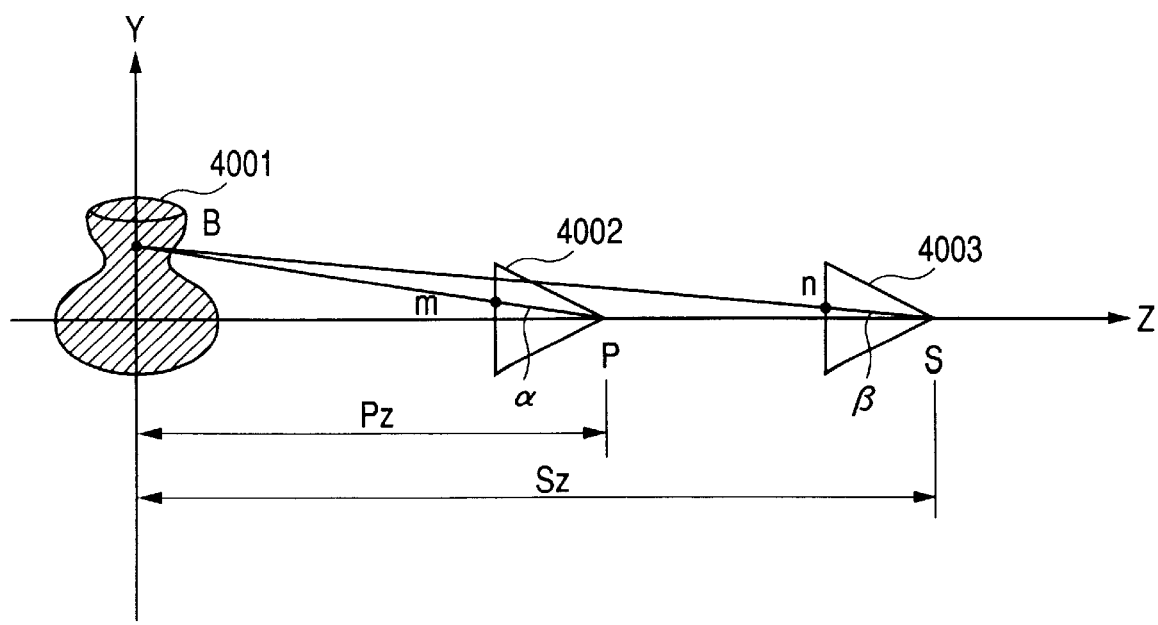
FIG. 40 is a view showing a principle of distortion correction in a longitudinal direction in the image forming of the second embodiment.

FIG. 40 is a view showing a principle to correct distortion in the image which is restructured as above. In the drawing, reference numeral 4001 denotes an object to be photographed, reference numeral 4002 denotes an image at a viewpoint position P intended to be restructured, and reference numeral 4003 denotes an image at a viewpoint position step S on the photographing viewpoints arranging line 3802.

With respect to one point B in the object 4001, it is assumed that the point B is close to the Y axis, a Z coordinate value Pz of the image 4002 at the viewpoint position P intended to be restructured and a Z coordinate value Sz of the image 4003 at the viewpoint position step S on the photographing viewpoints arranging line 3802 are sufficiently large, or the Z coordinate value Pz of the image 4002 at the viewpoint position P intended to be restructured and the Z coordinate value Sz of the image 4003 at the viewpoint position step S on the photographing viewpoints arranging line 3802 are substantially identical. At that time, light from the point B is recorded on a line m in the image 4002 at the viewpoint position P intended to be restructured and a line n in the image 4003 at the viewpoint position step S on the photographing viewpoints arranging line 3802. Therefore, if it is assumed that a pixel pitch of the virtual CCD 3803 is d, the focusing distance of the virtual camera 3804 is f, and the number of lines of the virtual CCD 3803 is N, following equations are obtained.

$$Pz \cdot \tan \alpha = Sz \cdot \tan \beta \quad (4)$$

$$\tan \alpha = d \cdot (N/2 - m)/f \quad (5)$$

$$\tan \beta = d \cdot (N/2 - n)/f \quad (6)$$

Further, by using the equations (4), (5) and (6), the following equation is obtained.

$$n = N/2 + (m - N/2) \cdot Sz/Pz \quad (7)$$

Therefore, the value of the line m in the image 4002 at the viewpoint position P intended to be restructured is equivalent to the value (obtained by equation (7)) of the line n in the image 4003 at the viewpoint position step S on the photographing viewpoints arranging line 3802.

Thus, after the processing in the step S3903, the flow advances to a step S3904 to copy the value of the i-th pixel of the line n of the image Q to the i-th pixel of the line j of the image P. By such processing, the phenomenon that the image is distorted when the image at the viewpoint position out of the photographing viewpoints arranging line 3802 is restructured can be suppressed to some extent.

Then, the flow advances to a step S3905 to judge whether or not the processing on all the pixels in the target line j has terminated. If terminated, the flow advances to a step S3907. On the other hand, if not terminated, the flow advances to a step S3906. In the step S3906, the target pixel i is shifted to a right-next pixel, and the flow returns to the step S3902.

Further, it is judged in the step S3907 whether or not the processing on all the lines in the image P has terminated. If terminated, this subroutine terminates. On the other hand, if not terminated, the flow advances to a step S3908 to shift the target line j to the next line and set the target pixel i to the left end of the line j, and then the flow returns to the step S3902.

As above, in the case where the group of the multi-viewpoint images photographed on the photographing viewpoints arranging line 3802 at minute intervals has been obtained, if the same processing is repeated on all the scanning lines on the basis of the above-described concept, the image at the viewpoint position out of the photographing viewpoints arranging line 3802 can be restructured.

(Third Embodiment)

In the first embodiment, as shown in FIG. 1, the virtual environment is shared by the plural terminal equipments by wholly changing the data representing the state of the virtual environment through the server device 102. However, the same effect can be derived even by using such communication arrangement not using the server device 102 as shown in FIG. 41.

Figure 41:
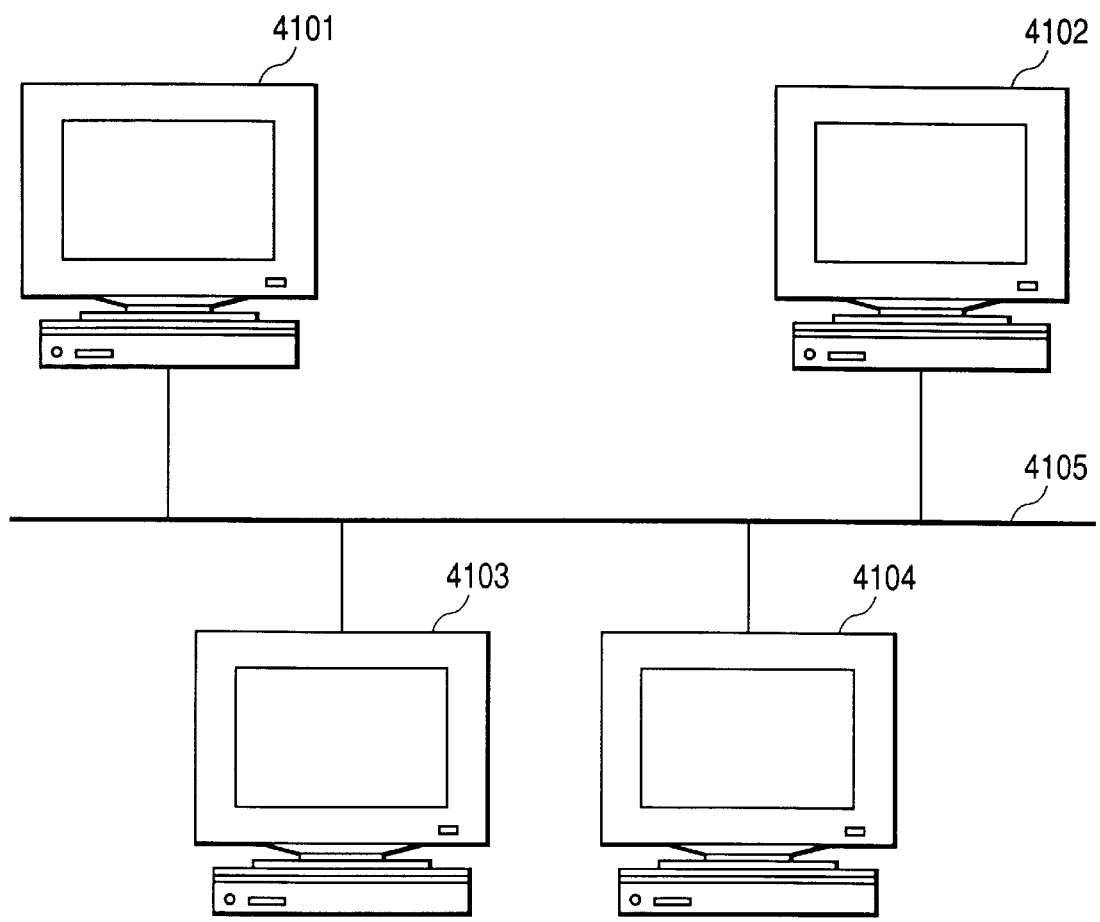
FIG. 41 is a block diagram showing a third embodiment.
Figure 42:
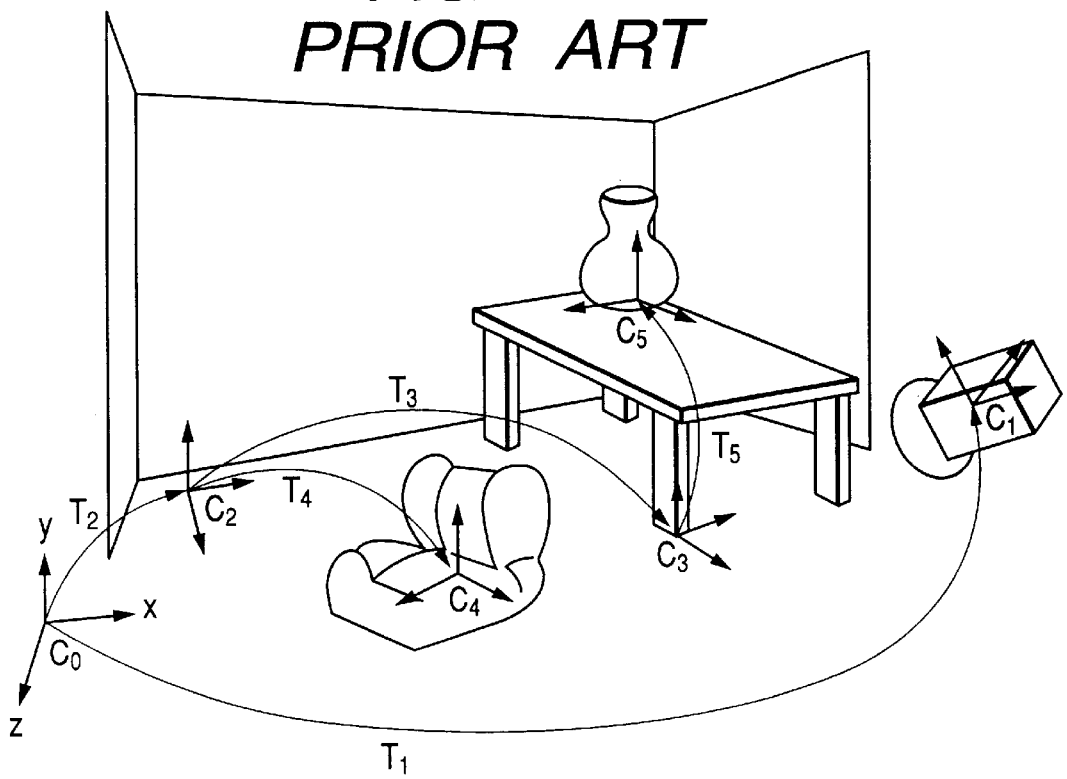
FIG. 42 is a view showing an example of virtual environment in the prior art (1)
Figure 43:
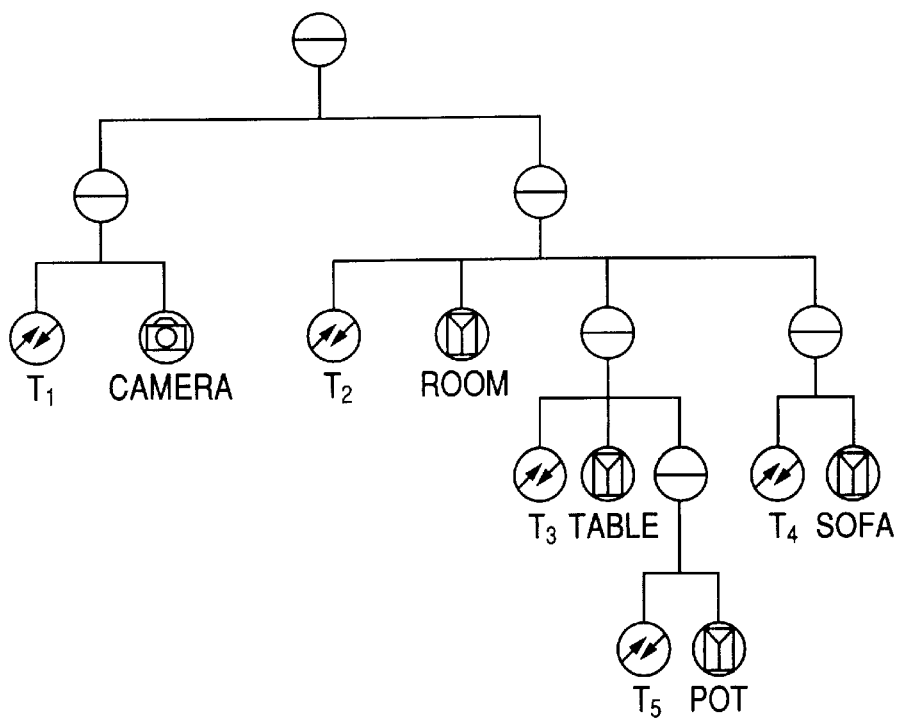
FIG. 43 is a view showing the virtual environment in FIG. 42 by using tree structure.

In FIG. 41, terminal equipments 4101 to 4104 are network-connected by using a bus 4105. Each terminal equipment performs the same processing as that performed by the terminal equipment in the first embodiment. However, it is necessary in the present embodiment that the command issued to the server device 102 in the first embodiment is set to be sent to all the terminal equipments connected in the network. In addition, it is necessary in the present embodiment that the terminal equipment is set to receive all the commands issued by the other terminal equipments and perform the same processing as that performed by the server device 102 in the first embodiment on the data within its own data memory device 503.

Further, in the first embodiment, when the data memory device 101 on the server device 102 side and the data memory devices 503 included in the plural terminal equipments are made physically common by using some means, a virtual space can be shared by the plural users even though the communication between the terminal equipment and the server device 102 as in the first embodiment is not performed.

Similarly, in the third embodiment, when the data memory devices 503 respectively included in the plural terminal equipments are made physically common by using some means, the virtual space can be shared by the plural users even though the communication between the terminal equipments as in the third embodiment is not performed.

As explained above in detail, according to the present embodiments, it is possible to derive the effect that the virtual environment including not only the simple shape data but also the highly complicated shape data can be shared by the plural users.

Further, in the shared virtual environment, it is possible to derive the effect that, when the user performs some processing on some object, the other users can easily view and recognize the change in the virtual environment caused by such processing.

What is claimed is:

1. An image processing apparatus comprising:
    tree-structure data memory means for storing tree-structure data, the tree-structure data including as components shape data geometrically describing a three-dimensional space and a three-dimensional object and light space data describing the three-dimensional space and the three-dimensional object based on a real-photographed image;
    displaying means for displaying a virtual three-dimensional space in which the shape data and the light space data are mixed with each other, based on the tree-structure data stored in said tree-structure data memory means;
    processing means for processing at least one of the shape data and the light space data both displayed;
    changing means for changing the tree-structure data stored in said tree-structure data memory means, based on the processing content by said processing means;

re-displaying means for re-displaying the virtual three-dimensional space, based on the data changing content by said changing means;

indication information generating means for generating indication information indicating the changing content of the tree-structure data, based on the processing content by said processing means; and transmitting means for transmitting the indication information generated by said indication information generating means to an another information processing apparatus connected to said image processing apparatus.

2. An apparatus according to claim 1, wherein said processing means moves, adds, deletes or changes at least one of the shape data and the light space data.

3. An apparatus according to claim 1, wherein the another information processing apparatus is a data distributing apparatus for distributing data to plural image processing apparatuses.

4. An apparatus according to claim 1, wherein the another information processing apparatus is an image processing apparatus having the same function as that of said image processing apparatus.

5. An apparatus according to claim 1, further comprising:

position and direction data memory means for storing data representing a viewpoint position and a sight-line direction of a user of said image processing apparatus in the virtual three-dimensional space, and wherein said displaying means displays the virtual three-dimensional space based on the data representing the viewpoint position and the sight-line direction stored in said position and direction data memory means.

6. An apparatus according to claim 5, wherein said transmitting means transmits the indication information generated by said indication information generating means, and also transmits the data representing the viewpoint position and the sight-line direction stored in said position and direction data memory means.

7. An apparatus according to claim 1, wherein three-dimensional image data led from two-dimensional multi-viewpoint images is also used as the tree-structure data.

8. An apparatus according to claim 1, wherein, in the processing by said processing means, said re-displaying means discriminatingly displays the shape data or the light space data being the object of the processing.

9. An image processing apparatus comprising:

tree-structure data memory means for storing tree-structure data, the tree-structure data including as components shape data geometrically describing a three-dimensional space and a three-dimensional object and light space data describing the three-dimensional space and the three-dimensional object based on a real-photographed image;

displaying means for displaying a virtual three-dimensional space in which the shape data and the light space data are mixed with each other, based on the tree-structure data stored in said tree-structure data memory means;

receiving means for receiving indication information indicating a changing content of the tree-structure data, transmitted from an another information processing apparatus connected to said image processing apparatus;

changing means for changing the tree-structure data stored in said tree-structure data memory means, based on the indication information received by said receiving means; and re-displaying means for re-displaying the virtual three-dimensional space, based on the data changing content by said changing means.

10. An apparatus according to claim 9, wherein the changing content indicated by the indication information received by said receiving means is to move, add, delete or change at least one of the shape data and the light space data.

11. An apparatus according to claim 9, wherein the another information processing apparatus is a data distributing apparatus for distributing data to plural image processing apparatuses.

12. An apparatus according to claim 9, wherein the another information processing apparatus is an image processing apparatus having the same function as that of said image processing apparatus.

13. An apparatus according to claim 9, wherein said receiving means receives the indication information indicating the changing content of the tree-structure data, and also receives data representing a viewpoint position and a sight-line direction of a user of the another image processing apparatus in the virtual three-dimensional space.

14. An apparatus according to claim 13, further comprising data generating means for generating data representing a virtual model of the user of the another image processing apparatus in the virtual three-dimensional space, based on the data representing the viewpoint position and the sight-line direction received by said receiving means, and wherein said re-displaying means displays the virtual model of the user of the another image processing apparatus, in the virtual three-dimensional space.

15. An apparatus according to claim 9, wherein three-dimensional image data led from two-dimensional multi-viewpoint images is also used as the tree-structure data.

16. An apparatus according to claim 9, wherein said re-displaying means discriminatingly displays the shape data or the light space data being the object of the processing, based on the indication information received by said receiving means and indicating the changing content in the tree-structure data.

17. An image processing method which is used in an image processing apparatus comprising a tree-structure data memory means for storing tree-structure data, the tree-structure data including as components shape data geometrically describing a three-dimensional space and a three-dimensional object and light space data describing the three-dimensional space and the three-dimensional object based on a real-photographed image, said method comprising:

a displaying step of displaying a virtual three-dimensional space in which the shape data and the light space data are mixed with each other, based on the tree-structure data stored in the tree-structure data memory means;

a processing step of processing at least one of the shape data and the light space data both displayed;

a changing step of changing the tree-structure data stored in the tree-structure data memory means, based on the processing content in said processing step;

a re-displaying step of re-displaying the virtual three-dimensional space, based on the data changing content in said changing step;

an indication information generating step of generating indication information indicating the changing content of the tree-structure data, based on the processing content in said processing step; and a transmitting step of transmitting the indication information generated in said indication information generating step to an another information processing apparatus connected to the image processing apparatus.

18. A method according to claim 17, wherein in said processing step at least one of the shape data and the light space data is moved, added, deleted or changed.

19. A method according to claim 17, wherein the another information processing apparatus is a data distributing apparatus for distributing data to plural image processing apparatuses.

20. A method according to claim 17, wherein the another information processing apparatus is an image processing apparatus having the same function as that of the above-described image processing apparatus.

21. A method according to claim 17, wherein the image processing apparatus further comprises a position and direction data memory means for storing data representing a viewpoint position and a sight-line direction of a user of the image processing apparatus in the virtual three-dimensional space, and
 in said displaying step the virtual three-dimensional space is displayed based on the data representing the viewpoint position and the sight-line direction stored in the position and direction data memory means.

22. A method according to claim 21, wherein, in said transmitting step, the indication information generated in said indication information generating step is transmitted, and also the data representing the viewpoint position and the sight-line direction stored in the position and direction data memory means is transmitted.

23. A method according to claim 17, wherein three-dimensional image data led from two-dimensional multi-viewpoint images is also used as tree-structure data.

24. A method according to claim 17, wherein, in said re-displaying step, the shape data or the light space data being the object of the processing in said processing step is discriminatingly displayed.

25. An image processing method which is used in an image processing apparatus comprising a tree-structure data memory means for storing tree-structure data, the tree-structure data including as components shape data geometrically describing a three-dimensional space and a three-dimensional object and light space data describing the three-dimensional space and the three-dimensional object based on a real-photographed image, said method comprising:
 a displaying step of displaying a virtual three- dimensional space in which the shape data and the light space data are mixed with each other, based on the tree-structure data stored in the tree-structure data memory means;
 a receiving step of receiving indication information indicating a changing content of the tree-structure data, transmitted from an another information processing apparatus connected to the image processing apparatus;
 a changing step of changing the tree-structure data stored in the tree-structure data memory means, based on the indication information received in said receiving step; and
 a re-displaying step of re-displaying the virtual three-dimensional space, based on the data changing content in said changing step.

26. A method according to claim 25, wherein the changing content indicated by the indication information received in said receiving step is to move, add, delete or change at least one of the shape data and the light space data.

27. A method according to claim 25, wherein the another information processing apparatus is a data distributing apparatus for distributing data to plural image processing apparatuses.

28. A method according to claim 25, wherein the another information processing apparatus is an image processing apparatus having the same function as that of the above-described image processing apparatus.

29. A method according to claim 25, wherein, in said receiving step, the indication information indicating the changing content of the tree-structure data is received, and also data representing a viewpoint position and a sight-line direction of a user of the another image processing apparatus in the virtual three-dimensional space is received.

30. A method according to claim 29, further comprising a data generating step of generating data representing a virtual model of the user of the another image processing apparatus in the virtual three-dimensional space, based on the data representing the viewpoint position and the sight-line direction received in said receiving step, and
 wherein in said re-displaying step the virtual model of the user of the another image processing apparatus is displayed in the virtual three-dimensional space.

31. A method according to claim 25, wherein three-dimensional image data led from two-dimensional multi-viewpoint images is also used as the tree-structure data.

32. A method according to claim 25, wherein in said re-displaying step the shape data or the light space data being the object of the changing in said changing step is discriminatingly displayed based on the indication information received in said receiving step and indicating the changing content in the tree-structure data.

33. A computer-readable memory medium which is used in an image processing apparatus comprising a tree-structure data memory means for storing tree-structure data, the tree-structure data including as components shape data geometrically describing a three-dimensional space and a three-dimensional object and light space data describing the three-dimensional space and the three-dimensional object based on a real-photographed image, and which stores a computer program including:
 a displaying module for displaying a virtual three-dimensional space in which the shape data and the light space data are mixed with each other, based on the tree-structure data stored in the tree-structure data memory means;
 a processing module for processing at least one of the shape data and the light space data both displayed;
 a changing module for changing the tree-structure data stored in the tree-structure data memory means, based on the processing content;
 a re-displaying module for re-displaying the virtual three-dimensional space, based on the data changing content;
 an indication information generating module for generating indication information indicating the changing content of the tree-structure data, based on the processing content; and
 a transmitting module for transmitting the generated indication information to an another information processing apparatus connected to the image processing apparatus.

34. A computer-readable memory medium which is used in an image processing apparatus comprising a tree-structure data memory means for storing tree-structure data, the tree-structure data including as components shape data geometrically describing a three-dimensional space and a three-dimensional object and light space data describing the three-dimensional space and the three-dimensional object based on a real-photographed image, and which stores a computer program including:

a displaying module for displaying a virtual three-dimensional space in which the shape data and the light space data are mixed with each other, based on the tree-structure data stored in the tree-structure data memory means;

a receiving module for receiving indication information indicating a changing content of the tree-structure data, transmitted from an another information processing apparatus connected to the image processing apparatus;

a changing module for changing the tree-structure data stored in the tree-structure data memory means, based on the received indication information; and a re-displaying module for re-displaying the virtual three-dimensional space, based on the data changing content.

35. An image processing system in which a first terminal equipment is connected to a second terminal equipment through a server, comprising:

said first terminal equipment further comprising,
first tree-structure data memory means for storing tree-structure data, the tree-structure data including as components shape data geometrically describing a three-dimensional space and a three-dimensional object and light space data describing the three-dimensional space and the three-dimensional object based on a real-photographed image,
first displaying means for displaying a virtual three-dimensional space in which the shape data and the light space data are mixed with each other, based on the tree-structure data stored in said first tree-structure data memory means,
processing means for processing at least one of the shape data and the light space data both displayed,
first changing means for changing the tree-structure data stored in said first tree-structure data memory means, based on the processing content by said processing means,
first re-displaying means for re-displaying the virtual three-dimensional space, based on the data changing content by said first changing means,
indication information generating means for generating indication information indicating the changing content of the tree-structure data, based on the processing content by said processing means, and
first transmitting means for transmitting the indication information generated by said indication information generating means to said server connected to said first terminal equipment;

said server further comprising,
first receiving means for receiving the indication information transmitted from said first terminal equipment, and
second transmitting means for transmitting the indication information received by said first receiving means to said second terminal equipment; and said second terminal equipment further comprising,
second tree-structure data memory means for storing tree-structure data, the tree-structure data including as components shape data geometrically describing a three-dimensional space and a three-dimensional object and light space data describing the three-dimensional space and the three-dimensional object based on a real-photographed image,
second displaying means for displaying a virtual three-dimensional space in which the shape data and the light space data are mixed with each other, based on the tree-structure data stored in said second tree-structure data memory means,
second receiving means for receiving the indication information indicating the changing content of the tree-structure data, transmitted from said server connected to said second terminal equipment,
second changing means for changing the tree-structure data stored in said second tree-structure data memory means, based on the indication information received by said second receiving means, and
second re-displaying means for re-displaying the virtual three-dimensional space, based on the data changing content by said second changing means.

36. An image processing system in which a first terminal equipment and a second terminal equipment are connected to each other, comprising:

said first terminal equipment further comprising,
first tree-structure data memory means for storing tree-structure data, the tree-structure data including as components shape data geometrically describing a three-dimensional space and a three-dimensional object and light space data describing the three-dimensional space and the three-dimensional object based on a real-photographed image,
first displaying means for displaying a virtual three-dimensional space in which the shape data and the light space data are mixed with each other, based on the tree-structure data stored in said first tree-structure data memory means,
processing means for processing at least one of the shape data and the light space data both displayed,
first changing means for changing the tree-structure data stored in said first tree-structure data memory means, based on the processing content by said processing means,
first re-displaying means for re-displaying the virtual three-dimensional space, based on the data changing content by said first changing means,
indication information generating means for generating indication information indicating the changing content of the tree-structure data, based on the processing content by said processing means, and
transmitting means for transmitting the indication information generated by said indication information generating means to said second terminal equipment connected to said first terminal equipment; and said second terminal equipment further comprising,
second tree-structure data memory means for storing tree-structure data, the tree-structure data including as components shape data geometrically describing a three-dimensional space and a three-dimensional object and light space data describing the three-dimensional space and the three-dimensional object based on a real-photographed image,
second displaying means for displaying a virtual three-dimensional space in which the shape data and the light space data are mixed with each other, based on the tree-structure data stored in said second tree-structure data memory means,
receiving means for receiving the indication information indicating the changing content of the tree-structure data, transmitted from said first terminal equipment connected to said second terminal equipment,
second changing means for changing the tree-structure data stored in said second tree-structure data memory means, based on the indication information received by said receiving means, and
second re-displaying means for re-displaying the virtual three-dimensional space, based on the data changing content by said second changing means.

* * * * *

UNITED STATES PATENT AND TRADEMARK OFFICE
CERTIFICATE OF CORRECTION

PATENT NO. : 6,151,028
DATED : November 21, 2000
INVENTOR(S) : Atusushi Kumagai, et al.

It is certified that error appears in the above-identified patent and that said Letters Patent is hereby corrected as shown below:

<u>Title page,</u>
<u>Item [56] REFERENCES CITED - OTHER PUBLICATIONS</u>
In Distributed Microscopy: "boston," should read -- Boston, --.

<u>Item [57] ABSTRACT,</u>
Line 16, "the" (first occurrence) should be deleted.

<u>Column 2,</u>
Line 16, "of" (second occurrence) should be deleted.

<u>Column 16,</u>
Line 63, "such" should be deleted.

<u>Column 23,</u>
Line 9, "an" should be deleted.

<u>Column 25,</u>
Line 44, "three- dimen-" should read -- three-dimen --.

Signed and Sealed this

Sixteenth Day of October, 2001

Attest:

*Nicholas P. Godici*

NICHOLAS P. GODICI
*Attesting Officer*      *Acting Director of the United States Patent and Trademark Office*